US011645014B1

(12) United States Patent
Bondurant et al.

(10) Patent No.: US 11,645,014 B1
(45) Date of Patent: May 9, 2023

(54) DISAGGREGATED STORAGE WITH MULTIPLE CLUSTER LEVELS

(71) Applicant: HEWLETT PACKARD ENTERPRISE DEVELOPMENT LP, Houston, TX (US)

(72) Inventors: Matthew D. Bondurant, Superior, CO (US); Benjamin Simpson, Andover, MA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 17/452,304

(22) Filed: Oct. 26, 2021

(51) Int. Cl.
*G06F 3/06* (2006.01)

(52) U.S. Cl.
CPC ............ *G06F 3/067* (2013.01); *G06F 3/0604* (2013.01); *G06F 3/0655* (2013.01)

(58) Field of Classification Search
None
See application file for complete search history.

(56) References Cited

U.S. PATENT DOCUMENTS

| | | | |
|---|---|---|---|
| 9,817,703 B1* | 11/2017 | Ryland | G06F 9/52 |
| 2012/0173541 A1* | 7/2012 | Venkataramani | G06F 12/0844 707/769 |
| 2019/0065258 A1 | 2/2019 | Irudayaraj et al. | |
| 2019/0087220 A1 | 3/2019 | Turner | |
| 2019/0097838 A1 | 3/2019 | Sahoo et al. | |
| 2020/0034132 A1* | 1/2020 | U | G06F 8/65 |
| 2020/0034240 A1 | 1/2020 | Natanzon et al. | |
| 2020/0034254 A1 | 1/2020 | Natanzon | |
| 2020/0042632 A1 | 2/2020 | Natanzon et al. | |
| 2020/0137185 A1 | 4/2020 | Parekh | |
| 2020/0174842 A1 | 6/2020 | Wang et al. | |
| 2020/0233712 A1 | 7/2020 | Meng | |
| 2020/0304297 A1 | 9/2020 | Radhakrishnan | |

FOREIGN PATENT DOCUMENTS

CN 109327544 A * 2/2019 ......... H04L 41/0668

OTHER PUBLICATIONS

Hewlett Packard Enterprise Development LP, "HPE 3PAR Peer Persistence Software—Overview", available online at <https://support.hpe.com/hpesc/public/docDisplay?docLocale=en_US&docId=emr_na-a00042347en_us>, retrieved Oct. 13, 2021, 1 page.
Hewlett Packard Enterprise Development LP, "HPE 3PAR Quorum Witness Installation and Update Guide," available online at<<https://support.hpe.com/hpesc/public/docDisplay?docId=a00064651en_us&docLocale=en_US>, Edition: 1, Part No. P30348-001, Mar. 2020, 26 pages.
HPE Technology, "HPE 3PAR Peer Persistence demo", available online at <https://www.youtube.com/watch?v=Eet92dOra24>>, Aug. 4, 2018, 10 pages.
IBM Cloud Education, "etcd", IBM Cloud Learn Hub, available online at <https://www.ibm.com/cloud/learn/etcd>, Dec. 18, 2019, 5 pages.

* cited by examiner

*Primary Examiner* — Brian R Peugh
(74) *Attorney, Agent, or Firm* — Trop, Pruner & Hu, P.C.

(57) ABSTRACT

Example implementations relate to disaggregated storage systems. An example method may include initializing a plurality of level 1 (L1) clusters in a disaggregated storage system, where each L1 cluster includes multiple compute nodes. The method may also include electing an L1 leader node in each L1 cluster, and forming a level 2 (L2) cluster including the L1 leader nodes. The method may include electing an L2 leader node by the L1 leader nodes included in the L2 cluster.

20 Claims, 19 Drawing Sheets

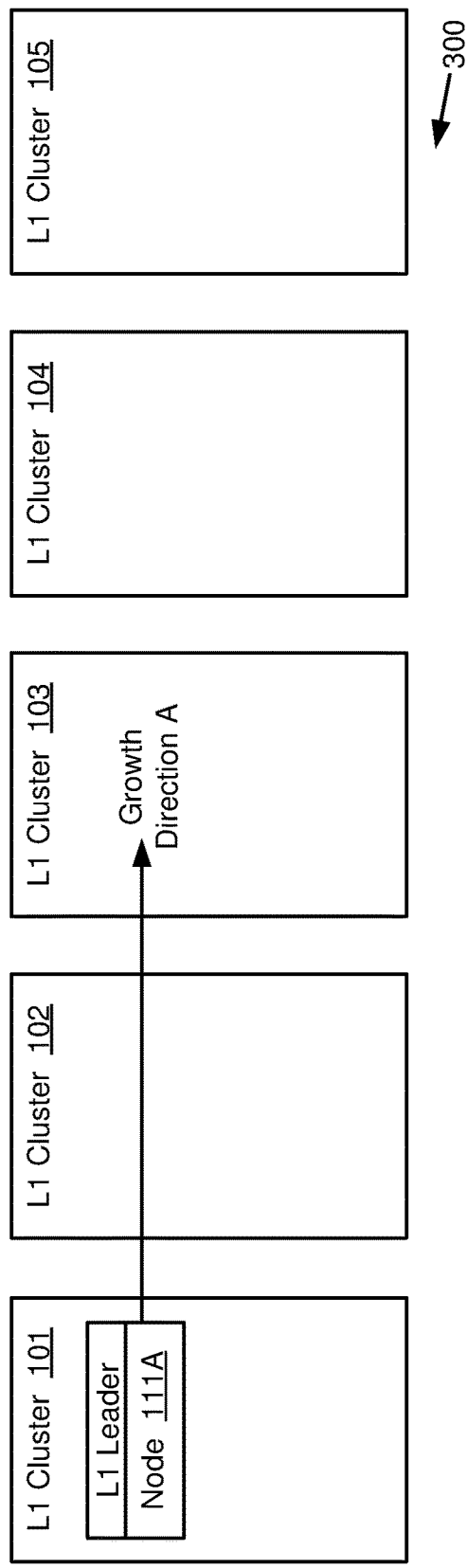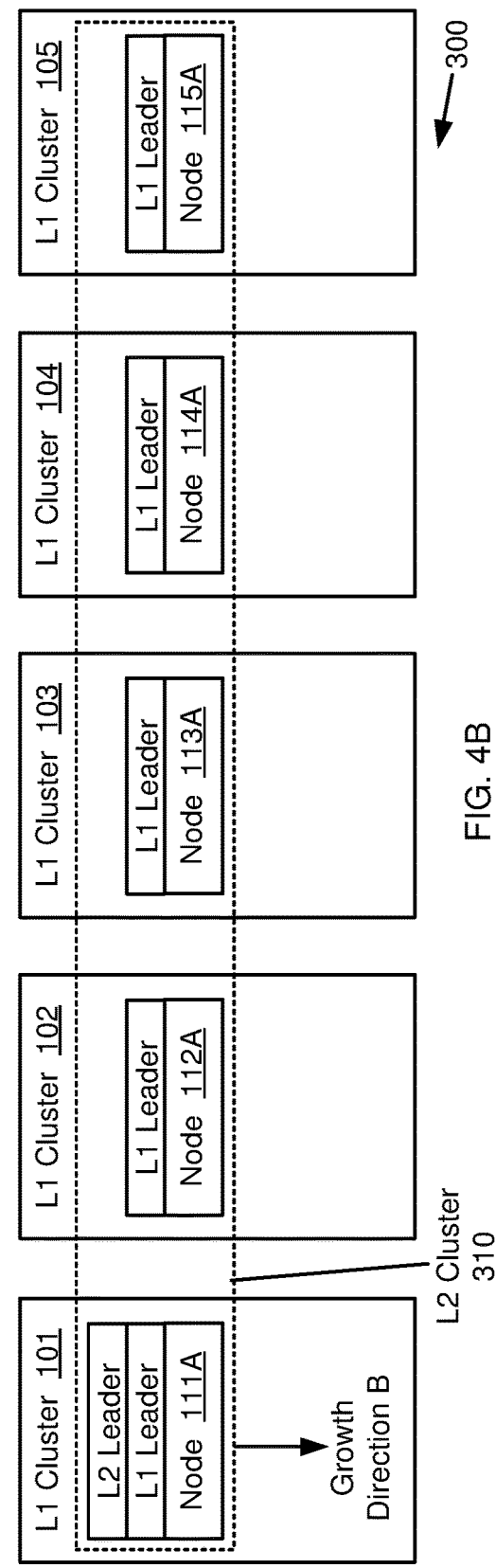
FIG. 4A
FIG. 4B

DISAGGREGATED STORAGE WITH MULTIPLE CLUSTER LEVELS

BACKGROUND

Some computing systems may store and access data in storage networks. A storage network may include a group of devices, or "nodes" herein, that are coupled via a communication medium (e.g., a network). In some examples, each node may include hardware and software components.

BRIEF DESCRIPTION OF THE DRAWINGS

Some implementations are described with respect to the following figures.

FIGS. 4A-4D are illustrations of example operations, in accordance with some implementations.

Figure 1:
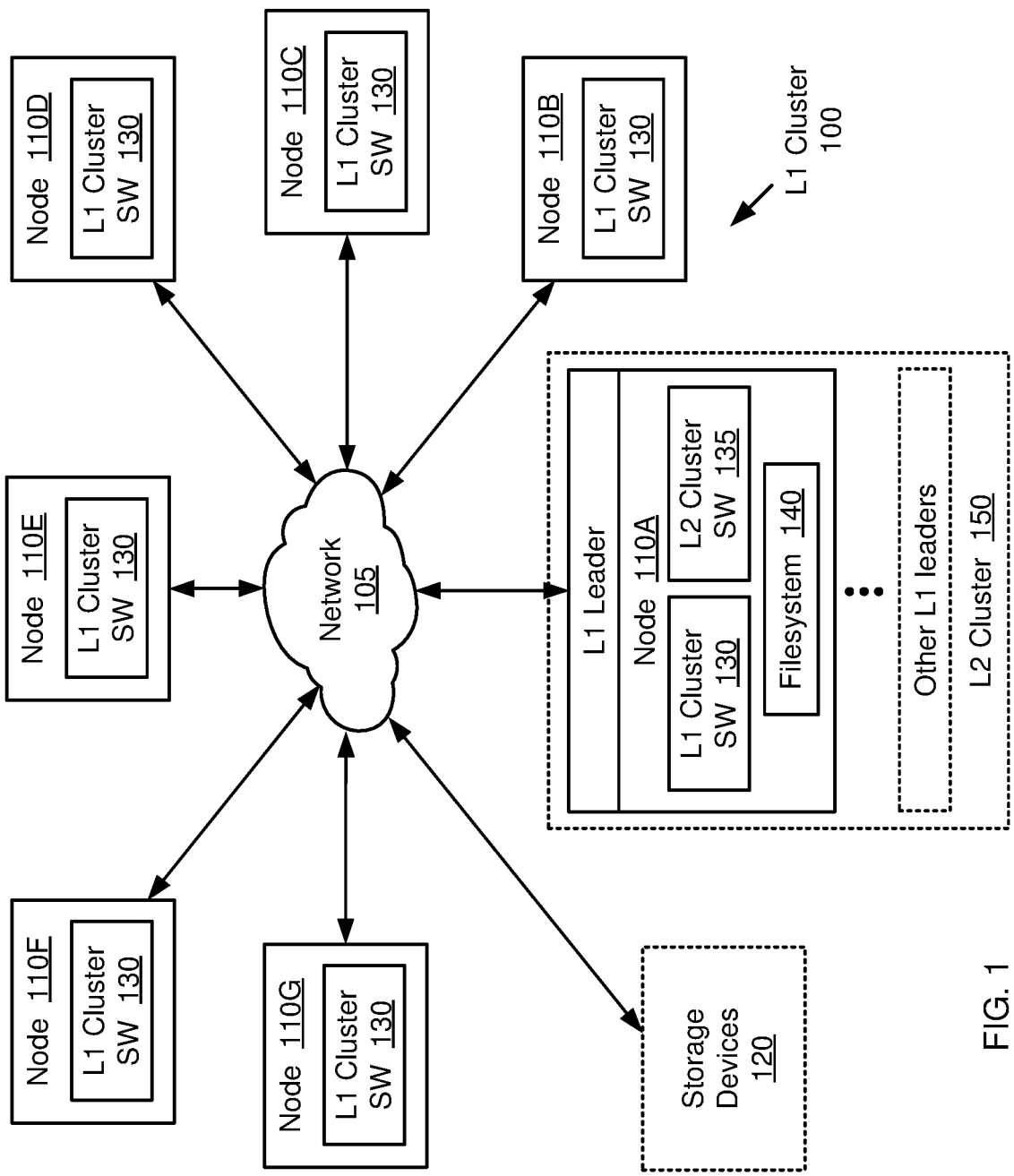
FIG. 1 is a schematic diagram of an example node cluster, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a disaggregated storage system may include compute nodes and storage devices coupled via network links. For example, the disaggregated storage system may include physical storage devices, physical compute nodes, one or more virtual storage devices, one or more virtual compute nodes, or a combination of one or more virtual storage devices and one or more virtual compute nodes. A storage device may include or manage any number of storage components to persistently store data. Each compute node may be a computing device (e.g., a server, controller, etc.) that can access the data stored in the storage devices. In some examples, the storage devices may collectively provide a plurality of volumes (e.g., virtual volumes), or other data objects (e.g., regions, portions, units, files), or the like, for storage of data. In such examples, only one compute node at a time may have permission to modify the data of any given volume (which may be referred to herein as the compute node "owning" or being "assigned" the given volume). While examples are described herein in relation to volumes, in other examples the respective nodes may own or be assigned any other type of data object in a disaggregated storage system in examples herein. However, one potential problem with such a disaggregated storage system is efficiently and reliably establishing agreement on which compute nodes own which volumes (or other portions, etc.) of the disaggregated storage system at a given time. In some examples, the compute nodes may be joined in a cluster and cluster management techniques may operate using consensus techniques to ensure that there is agreement about volume ownership among the compute nodes with that agreement being able to survive failures of nodes within the cluster. A potential problem in such cluster management techniques is enabling consensus techniques to perform efficiently when there are a relatively large number of compute nodes in the cluster being managed, and to survive compute node failures.

As noted above, in some examples, a disaggregated storage system may implement consensus-based cluster management techniques to maintain consistency of cluster management data (including, for example, indications of which compute nodes own which volumes at a given time) in the event of node failures. In some examples, some or all of the compute nodes may be grouped in a cluster, and the compute nodes in the cluster may conduct an election to select a particular compute node of the cluster as the leader of the cluster. The compute node that is the leader of the cluster may be responsible for updating cluster management data for the cluster, and for managing the replication of the cluster management data to the other compute nodes in the cluster (also referred to herein as "followers"). For example, when the leader compute node is to modify the stored cluster management data (e.g., in response to a request), the leader compute node may record the modification (or request) in a log entry and may communicate the log entry to all the follower compute nodes, thereby notifying the follower compute nodes of desired changes to the cluster management data. When the log entry is acknowledged by a minimum percentage of the follower compute nodes (referred to as "achieving consensus"), the leader compute node may consider the log entry to be committed. Accordingly, the leader compute node may then cause the desired modification to be performed on the cluster management data.

In some examples, increasing the number of compute nodes in the cluster may raise the likelihood that at least a minimum number of nodes remain in operation during or after a failure event, and may thereby improve the failure tolerance of the cluster. However, in a single cluster that includes more than a particular number of compute nodes (e.g., more than seven), the process of achieving consensus may involve a relatively large number of messages to communicate the log entry to and receive acknowledgements from the follower compute nodes, and may thereby consume a significant amount of time and bandwidth. Accordingly, performance of a single cluster with a relatively large number of compute nodes may suffer during operations that involve achieving consensus among the compute nodes.

In accordance with some implementations of the present disclosure, a disaggregated storage system may include storage devices and a relatively large number of compute nodes (e.g., more than seven) arranged in two or more cluster levels. The compute nodes may be divided into multiple level 1 (or "L1" herein) clusters, with each L1 cluster including multiple compute nodes. In each L1 cluster, a node of the L1 cluster may be elected, by the compute nodes in that L1 cluster, as the leader of the L1 cluster (referred to herein as the "L1 leader" or "L1 leader node"). In some implementations, one compute node from each of the L1 clusters (e.g., the L1 leader nodes) may be grouped into a level 2 (or "L2" herein) cluster, with each of the compute nodes in the L2 cluster being both a node (or "member") of the L2 cluster and a respective L1 cluster. The compute nodes of the L2 cluster may elect a leader of the L2 cluster (referred to herein as the "L2 leader" or "L2 leader node"). The compute nodes in the L2 cluster may be responsible for maintaining and updating multiple copies of cluster management data, as described above, for the disaggregated storage system. For example, the cluster management data maintained and updated by the compute nodes of the L2 cluster may be cluster management data for all of the compute nodes of the disaggregated storage system, or those of the compute nodes in the L1 clusters. For example, the cluster management data maintained by the compute nodes of the L2 cluster may indicate, for all the compute nodes of the disaggregated storage system (and/or in one of the L1 clusters), which of the compute nodes own which of the volumes (or other portions) of the disaggregated storage system. Updating the multiple copies of the cluster management data may involve achieving consensus among the compute nodes (e.g., L1 leaders) in the L2 cluster. In such examples, the remaining compute nodes of the L1 clusters (i.e., the compute nodes not in the L2 cluster) are not involved in achieving this consensus. As such, consensus can be achieved without involving a relatively large number of messages among all of the compute nodes in the L1 clusters. In some examples, the L1 cluster compute nodes not in the L2 cluster (e.g., L1 cluster follower nodes) may be responsible for electing the L1 leaders, including replacing any L1 leaders that fail during operation. In some examples, each of the L1 leaders of the L1 clusters may be members of the L2 cluster. In such examples, the follower nodes in the L1 clusters may be used to recover from the failure of L1 leaders, and thus to recover from the failure of compute nodes in the L2 cluster. In this manner, the hierarchical structure of the L1 and L2 clusters may improve the failure tolerance of the disaggregated storage system by including a relatively large number of compute nodes, but without suffering the loss of performance associated with using a relatively large number of compute nodes in a single cluster (i.e., due to the large number of messages involved in achieving consensus among all member nodes in the single cluster).

In some examples, a storage device (e.g., a physical storage device) may include storage controller(s) that manage(s) access to stored data. A "data unit" can refer to any portion of data that can be separately managed in the storage system. In some cases, a data unit can refer to a block, a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

FIG. 1—Example Node Cluster

FIG. 1 shows an example of a level 1 (L1) cluster 100, in accordance with some implementations. As shown, the L1 cluster 100 may include multiple compute nodes 110A-110G (also referred to as "compute nodes 110") that are interconnected via a network 105. The L1 cluster 100 may be connected to storage devices 120. The L1 cluster 100 and the storage devices 120 may be included in a disaggregated storage system. In some implementations, the storage devices 120 may include persistent storage implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof. In some examples, the storage devices 120 may be coupled to the compute nodes 110 via the Non-Volatile Memory Express over fabrics (NVMe-oF) interface, Internet Small Computer Systems Interface (iSCSI), and the like.

In some implementations, each compute node 110 may be assigned a fixed network address (e.g., a fixed Internet Protocol (IP) address). Further, each compute node 110 may be implemented by a computing device (e.g., a server) that includes controller(s), memory, storage device(s), networking device(s), and so forth (not shown in FIG. 1). For example, each compute node 110 may be a physical computing device, or a virtual device hosted on a computing device. An example implementation of a compute node 110 is described below with reference to FIGS. 6A-6B.

In some implementations, each compute node 110 may comprise processing resource(s) to execute L1 cluster management software 130 (labelled "L1 Cluster SW 130" in FIG. 1), stored on a machine-readable storage medium, to provide the L1 cluster 100. Further, the L1 cluster management software 130 (e.g., etcd software) may use consensus-based management with an elected leader (e.g., using the Raft consensus algorithm). For example, assume that the compute nodes 110 have previously conducted an election, and have thereby elected the compute node 110A as the L1 leader (as indicated by the label "L1 Leader" shown in FIG. 1). In one or more implementations, performing the election for the L1 leader requires a quorum of compute nodes 110 in the L1 cluster 100. As used herein, a "quorum" of nodes refers to a minimum number or percentage of nodes that have to be operational in order for an election to be conducted. In examples described herein, a processing resource may comprise one or more processors (or other electronic circuitry) to execute instructions.

In some implementations, the L1 cluster 100 may be one of multiple L1 clusters included in a disaggregated storage system. Further, in some implementations, one compute node from each L1 cluster may be grouped to form a level 2 (L2) cluster 150. Various examples will be described herein in which the respective L1 leaders are selected to join the L2 cluster. However, in other examples, any node from a respective L1 cluster may be selected to join the L2 cluster. Note that, in FIG. 1, the L2 cluster 150 is shown in dotted line to indicate that the L2 cluster 150 is not included in the L1 cluster 100 (i.e., only the L1 leader 110A is included in both the L1 cluster 100 and the L2 cluster 150).

In some implementations, each of the members of the L2 cluster 150 may mount a filesystem 140 in which to store cluster management data. In the example of FIG. 1, leader node 110A (also referred to as "L1 leader 110A") may be a member of L2 cluster 150 and mount the filesystem 140. In some implementations, the L1 leader 110A may be assigned a representative network address that is associated with leadership of the L1 cluster 100. In some implementations, the filesystem 140 may be included in the storage devices 120.

In each L1 cluster, while the L2 cluster member (e.g., the L1 leader node) may mount a respective filesystem 140 and may write and modify cluster management data of the L2 cluster 150, the nodes of the L1 clusters that are not in the L2 cluster (e.g., the L1 follower nodes in each L1 cluster) may not write or modify the cluster management data of the L2 cluster 150. Further, the follower nodes may be responsible for electing the L1 leaders, including replacing any L1 leaders that fail during operation. Note that the L1 leader node and the follower nodes may perform other tasks that are unrelated to the management of the L1 cluster 100 or the L2 cluster 150.

In some implementations, each L1 leader in the L2 cluster 150 may execute L2 cluster management software 135 (labelled "L2 Cluster SW 135" in FIG. 1) to provide the L2 cluster 150. For example, processing resources of each L1 leader may execute instructions of the L2 cluster management software 135 that are stored on a machine-readable storage medium. In some implementations, the L1 leader can execute the L2 cluster management software 135 using the representative network address for its respective L1 cluster. Further, the L1 cluster management software 130 and the L2 cluster management software 135 may be two different software applications.

In some implementations, a separate storage partition may be statically assigned to each L1 cluster. Further, each L1 leader can access the storage partition assigned to its respective L1 cluster in order to mount its respective filesystem 140. Each storage partition may store a separate copy of cluster management data used by the L2 cluster 150 (also referred to as "L2 cluster management data"). For example, the stored L2 cluster management data may include data (e.g., a set of key-value pairs) that identifies which compute node is responsible for accessing (i.e., owns) each data volume (or other data object) stored in the disaggregated storage system. In another example, the stored L2 cluster management data may identify which node is responsible for each service available in the disaggregated storage system.

Alternatively, in some implementations, each L1 leader may not have storage provisioned in the disaggregated storage for the filesystem 140 storing cluster management data. For example, in such implementations, each L1 leader may store its respective copy of the L2 cluster management data in its local storage (e.g., a storage device included in the compute node 110A). Further, if an L1 leader fails, a new L1 leader may be elected in the respective L1 cluster. In such examples, the new L1 leader may need to rejoin the L2 cluster 150, and then obtain a new copy of the L2 cluster management data from the current L2 leader.

In some implementations, a disaggregated storage system may include two or more cluster levels (e.g., L1 cluster 100 and L2 cluster 150). This hierarchical structure of multiple cluster levels may allow the use of a relatively large number of nodes (e.g., more than seven), but without consuming the time and bandwidth involved in achieving consensus among all of the included nodes (i.e., if included in a single cluster). Accordingly, the hierarchical structure described herein may improve the failure tolerance of the disaggregated storage system by including a relatively large number of nodes, but without suffering the performance loss associated with using a relatively large number of nodes in a single cluster. Some example implementations of disaggregated storage with a hierarchy of multiple cluster levels are described below with reference to FIGS. 2-6B.

In some implementations, each L1 cluster may comprise both an L1 leader and an L2 member. In some examples, the L1 leader and the L2 member of an L1 cluster may be two different compute nodes of the L1 cluster. For example, in the example of L1 cluster 100 of FIG. 1, after a first compute node (e.g., node 110A) is elected to be the L1 leader of L1 cluster 100, a second compute node of the L1 cluster 100 (e.g., node 110C) may be selected (e.g., via an election or other mechanism) to be the L2 member from L1 cluster 100. Further, in such implementations, the second compute node (e.g., node 110C) would mount the filesystem 140 to write and modify cluster management data of the L2 cluster 150. The use of two different compute nodes of an L1 cluster for the L1 leader and the L2 member may be performed in certain situations, such as when the L1 leader is to be assigned other tasks that require a significant processing load, and therefore assigning the responsibilities of the L2 member to another compute node in the L1 cluster may be more efficient for the system as a whole.

FIGS. 2 and 3A-3J—Example Process and System for Disaggregated Storage

Figure 2:
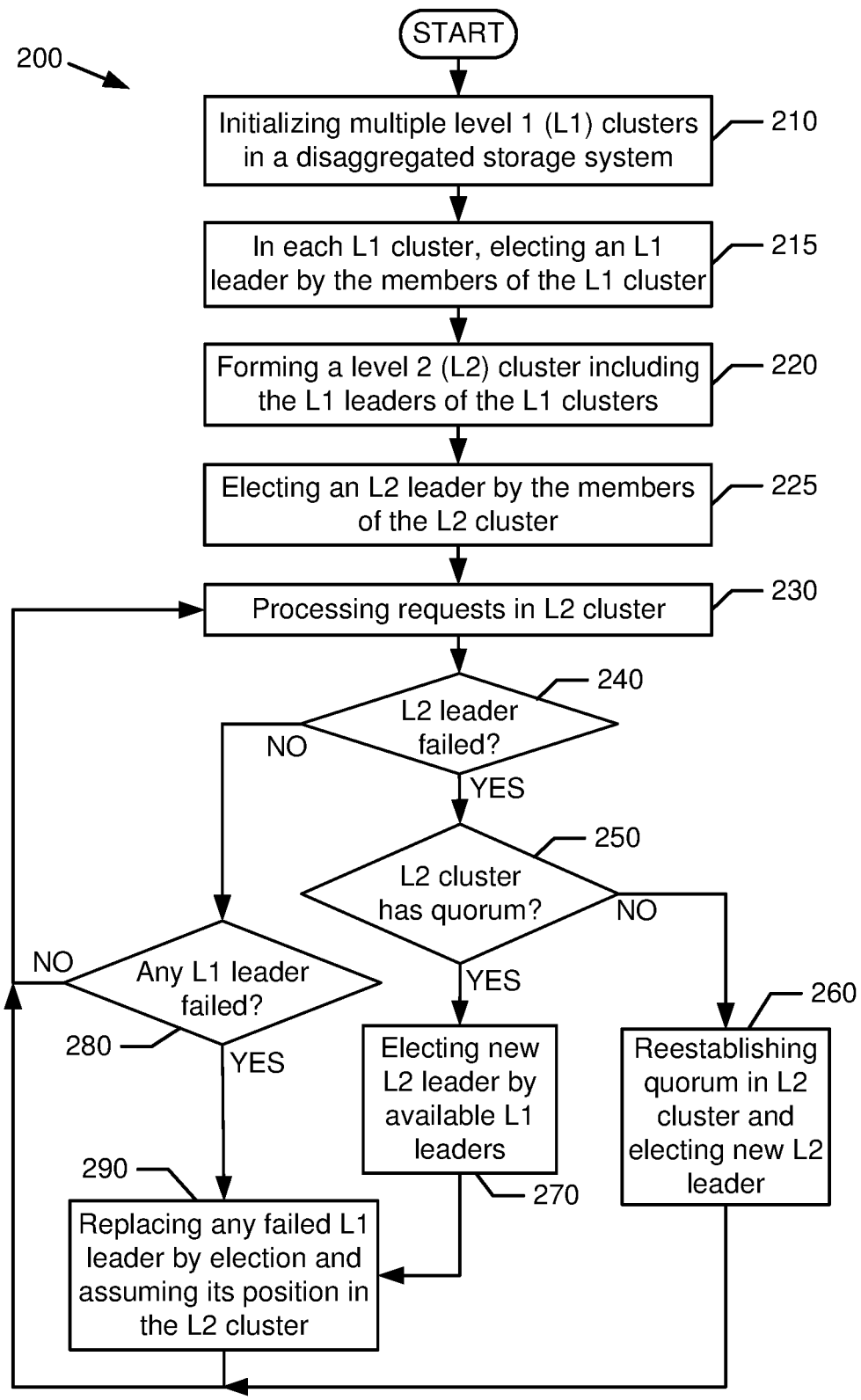
FIG. 2 is an illustration of an example process, in accordance with some implementations.

FIG. 2 illustrates an example process 200 for disaggregated storage, in accordance with some implementations. The process 200 may be performed using the compute nodes 110 (shown in FIG. 1). The process 200 may be implemented in hardware or a combination of hardware and programming (e.g., machine-readable instructions executable by processor(s)). The machine-readable instructions may be stored in a non-transitory computer readable medium, such as an optical, semiconductor, or magnetic storage device. The machine-readable instructions may be executed by a single processor, multiple processors, or other electronic circuitry. For the sake of illustration, details of the process 200 are described below with reference to FIGS. 3A-3J, which show examples of a disaggregated storage system in accordance with some implementations. However, other implementations are also possible.

Figure 3A:
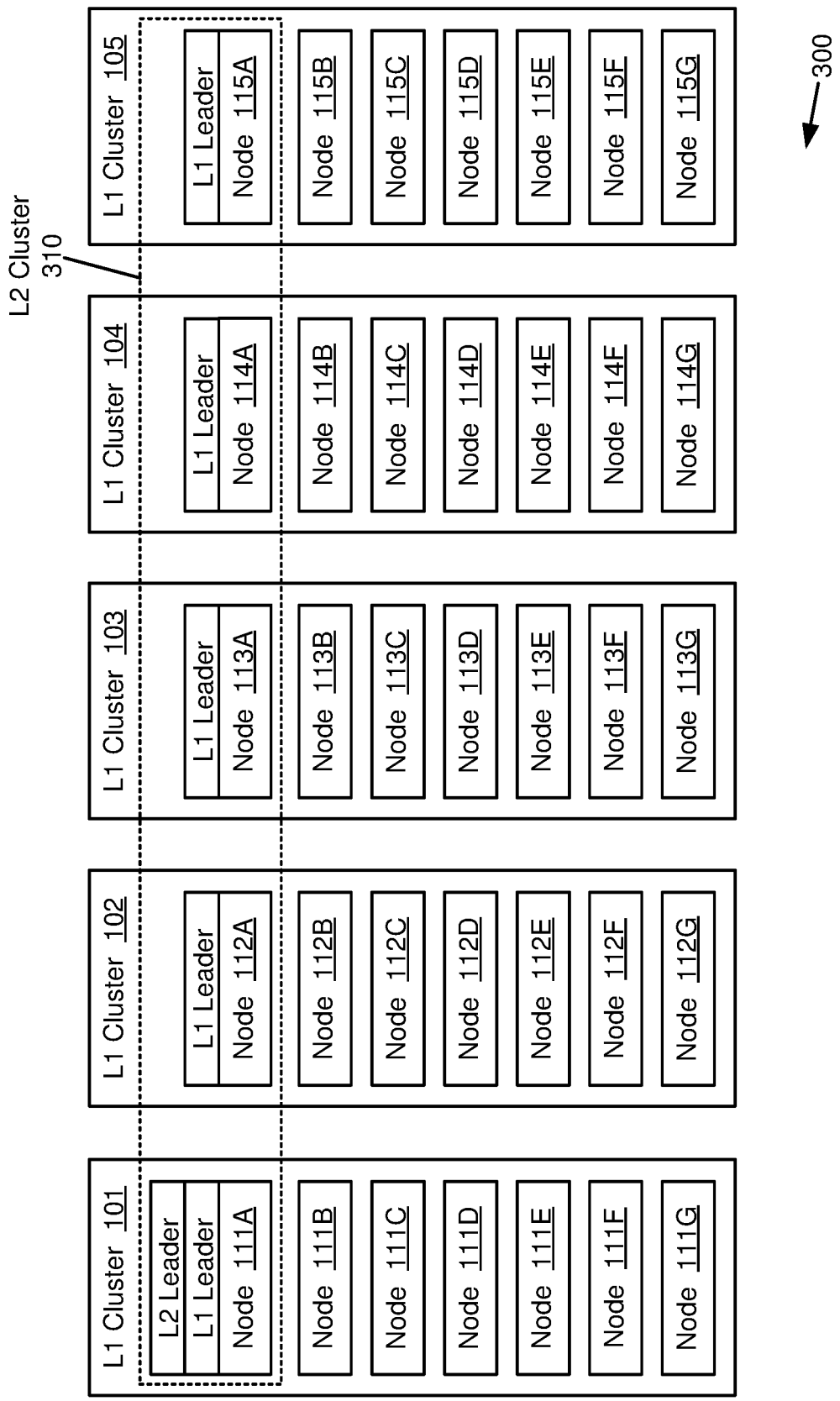
FIGS. 3A-3J are illustrations of an example system, in accordance with some implementations.

Block 210 may include initializing multiple Level 1 (L1) clusters in a disaggregated storage system. Block 215 may include, in each L1 cluster, electing an L1 leader by members of the L1 cluster. For example, referring to FIG. 3A, multiple L1 clusters 101-105 may be initialized in a disaggregated storage system 300. Each L1 cluster may include multiple compute nodes (e.g., L1 cluster 101 including compute nodes 111A-111G, L1 cluster 102 including compute nodes 112A-112G, and so forth). Further, in each L1 cluster, a compute node may be elected as the L1 leader by the compute nodes in that L1 cluster. For example, as shown in FIG. 3A, the compute node 111A is elected as the L1 leader of the L1 cluster 101 (as indicated by the label "L1 Leader"), node 112A is elected as the L1 leader of the L1 cluster 102, and so forth. In some implementations, performing the election for an L1 leader involves a quorum of compute nodes in that L1 cluster. Further, performing the election of the L1 leader involves each compute node separately performing actions to participate in the election. For example, in each L1 cluster, a controller in each compute node may execute instructions of L1 cluster software (e.g., L1 cluster management software 130 shown in FIG. 1) to cast a vote in the election for the L1 leader.

In some implementations, each compute node in the disaggregated storage system 300 may be assigned a fixed network address. Further, the current L1 leader of each L1 cluster may be assigned a different representative network address that is associated with leadership of that particular L1 cluster. For example, assume that the representative network address IP1 is assigned to whichever compute node is currently serving as the L1 leader of the L1 cluster 101, the representative network address IP2 is assigned to whichever compute node is currently serving as the L1 leader of the L1 cluster 102, and so forth.

Referring again to FIG. 2, block 220 may include forming a level 2 (L2) cluster including the L1 leaders of the L1 clusters. Block 225 may include electing an L2 leader by the members of the L2 cluster. For example, referring to FIG. 3A, the L2 cluster 310 may be formed from the L1 leaders of each L1 cluster (e.g., L1 leader 111A of L1 cluster 101, L1 leader 112A of L1 cluster 102, and so forth). Each L1 leader may be referred to as the "representative" of its respective L1 cluster in the L2 cluster 310. Further, the members of the L2 cluster 310 may hold an election, and may thereby elect the compute node 111A as the L2 leader of the L2 cluster 310 (as indicated by the label "L2 Leader"). In one or more implementations, performing the election for the L2 leader involves a quorum of L1 leaders in the L2 cluster 310 (i.e., a minimum number or percentage of L1 leaders that are operational to participate in the election). Further, performing the election of the L2 leader involves each L1 leader separately performing actions to participate in the election. For example, a controller in each L1 leader may execute instructions of L2 cluster software (e.g., L2 cluster management software 135 shown in FIG. 1) to cast a vote in the election for the L2 leader. In some implementations, the current L2 leader may be assigned a particular network address that is associated with leadership of the L2 cluster 150. For example, assume that the network address IP50 is assigned to whichever compute node is currently serving as the L2 leader of the L2 cluster 310.

Referring again to FIG. 2, block 230 may include processing data requests in the L2 cluster. For example, referring to FIG. 3A, the L2 leader 111A may receive a request to modify the cluster management data of the L2 cluster 310 (e.g., to change the compute node that is responsible for accessing a particular stored data volume). The request may be received directly from the client, or indirectly from another node of the disaggregated storage system 300. The L2 leader 111A may then record the request in a log entry, and communicate the log entry to the follower nodes of the L2 cluster 310 (i.e., L1 leaders 112A, 113A, 114A, 115A). Each L1 leader may update its respective copy of the L2 cluster management data (i.e., stored in the storage partition assigned to the respective L1 cluster) to reflect the log entry, and may acknowledge the log entry to the L2 leader when the update to its respective copy of the L2 cluster management data is completed. The L2 leader may determine when enough of the follower nodes of the L2 cluster 310 have acknowledged the log entry to achieve consensus. In some implementations, consensus may be achieved when the number or percentage of received acknowledgements exceeds a defined threshold (e.g., at least 50% of the other nodes have acknowledged). Once the L2 leader node 111A determines that consensus has been reached, the request may be executed and/or confirmed (e.g., by the L2 leader making the requested modification of the L2 cluster management data).

Figure 3B:
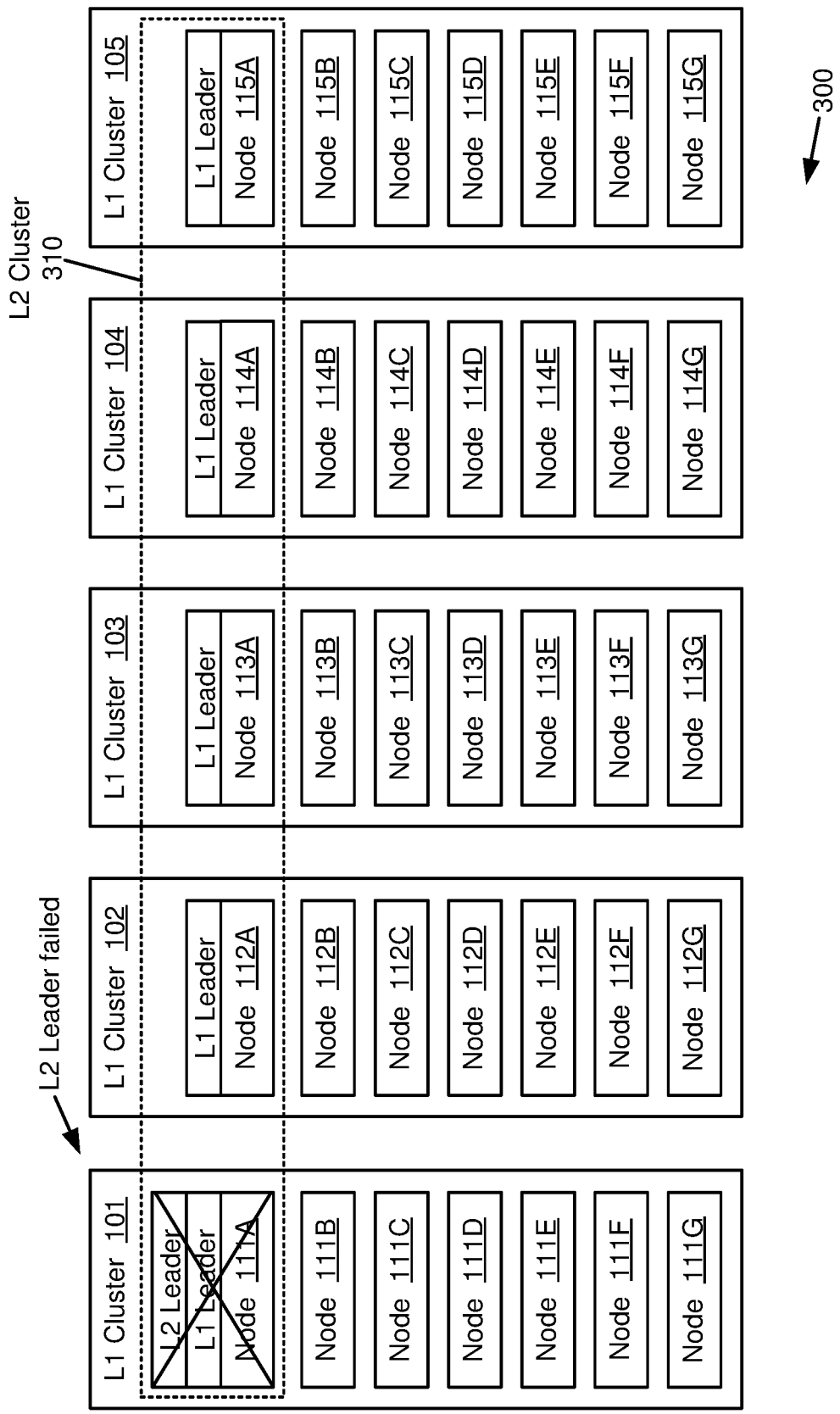
Figure 3C:
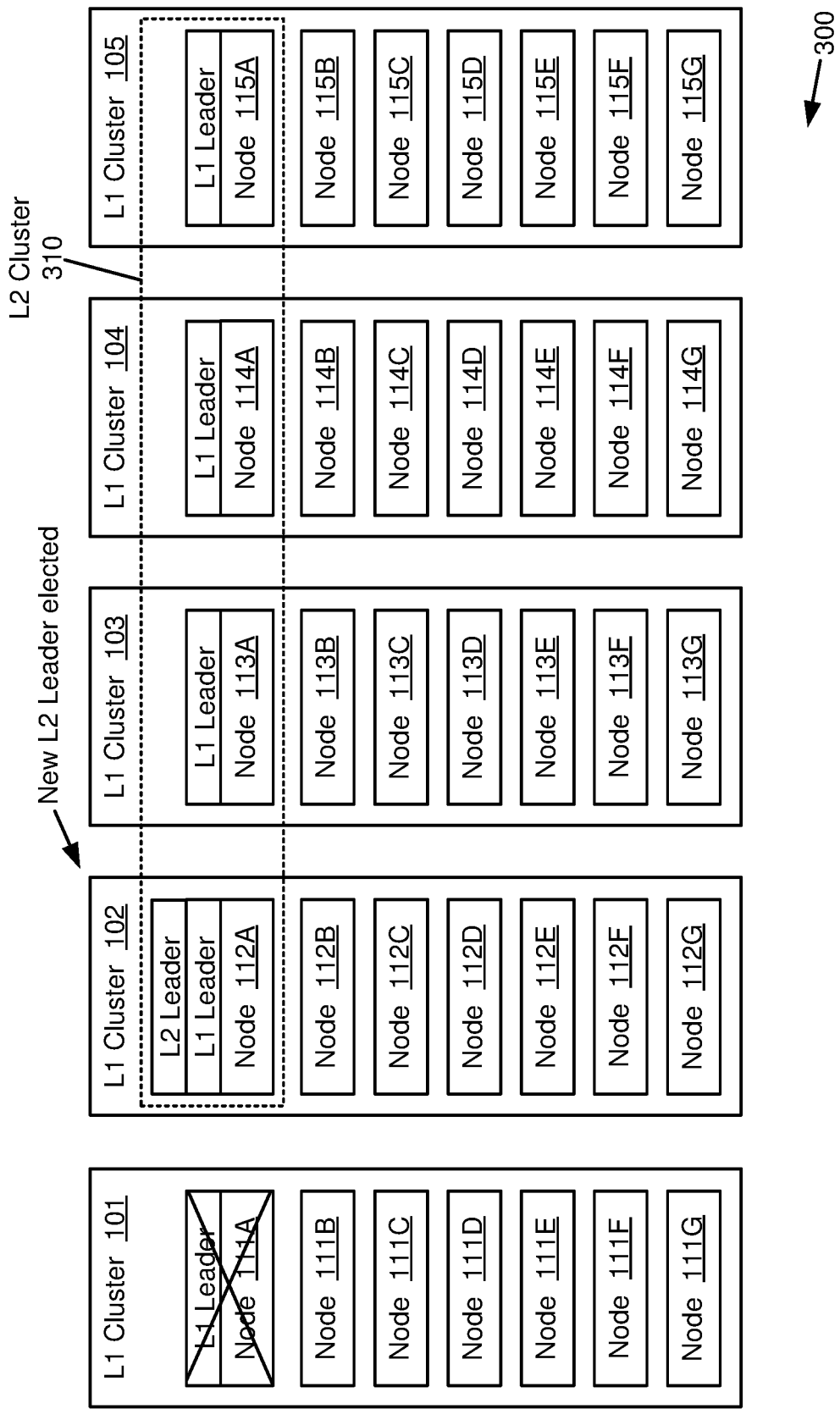
Figure 3D:
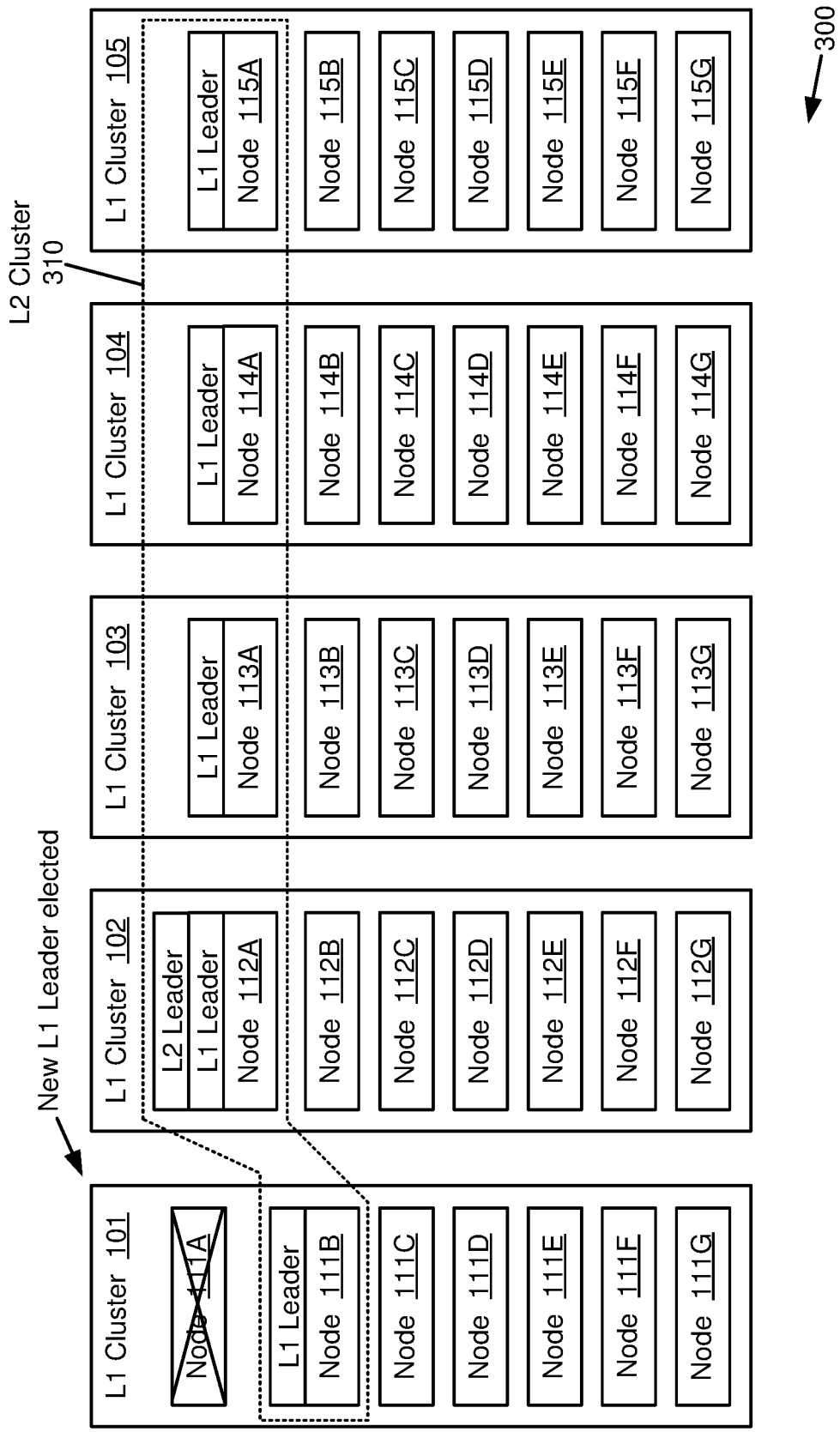

Referring again to FIG. 2, decision block 240 may include determining whether the L2 leader has failed. If it is determined that the L2 leader has not failed ("NO"), then the process 200 may continue at decision block 280, including determining whether any L1 leader has failed. If it is determined that no L1 leaders have failed ("NO"), then the process 200 may return to block 230 (i.e., to continue processing requests in the L2 cluster). However, if it is determined at decision block 280 that at least one L1 leader has failed ("YES"), then the process 200 may continue at block 290, including replacing any failed L1 leader by election and having the newly elected L1 leader assume the position of the failed L1 leader in the L2 cluster. After block 290, the process 200 may return to block 230. However, if it is determined at decision block 240 that the L2 leader has failed ("YES"), then the process 200 may continue at decision block 250, including determining whether the L2 cluster still has a quorum. If it is determined at decision block 250 that the L2 cluster still has a quorum ("YES"), then the process 200 may continue at block 270, including the available L1 leaders (i.e., L1 leaders that have not failed) electing a new L2 leader from among the available L1 leaders. After block 270, the process 200 may continue at block 290 (described above). For example, FIG. 3B illustrates that the L2 leader 111A has failed in the disaggregated storage system 300. In response, as shown in FIG. 3C, the remaining nodes of the L2 cluster 310 (i.e., L1 leaders 112A, 113A, 114A, 115A) conduct an election that selects the compute node 112A (i.e., the L1 leader in the L1 cluster 102) as the new L2 leader. Further, as shown in FIG. 3C, the L1 cluster 101 has lost its L1 leader (i.e., failed compute node 111A), and therefore no longer has a representative in the L2 cluster 310. Accordingly, as shown in FIG. 3D, the remaining nodes of the L1 cluster 101 (i.e., compute nodes 111B-111G) conduct an election that selects the compute node 111B as the new L1 leader for the L1 cluster 101. The new L1 leader 111B may then be included in the L2 cluster 310 as the representative for the L1 cluster 101 (e.g., by being assigned the representative network address for L1 cluster 101 that is included in L2 cluster 310). The L2 cluster 310 may then resume handling client requests. In this manner, the disaggregated storage system 300 may recover from the loss of a L2 leader or a L1 leader, and may resume handling client requests.

Figure 3E:
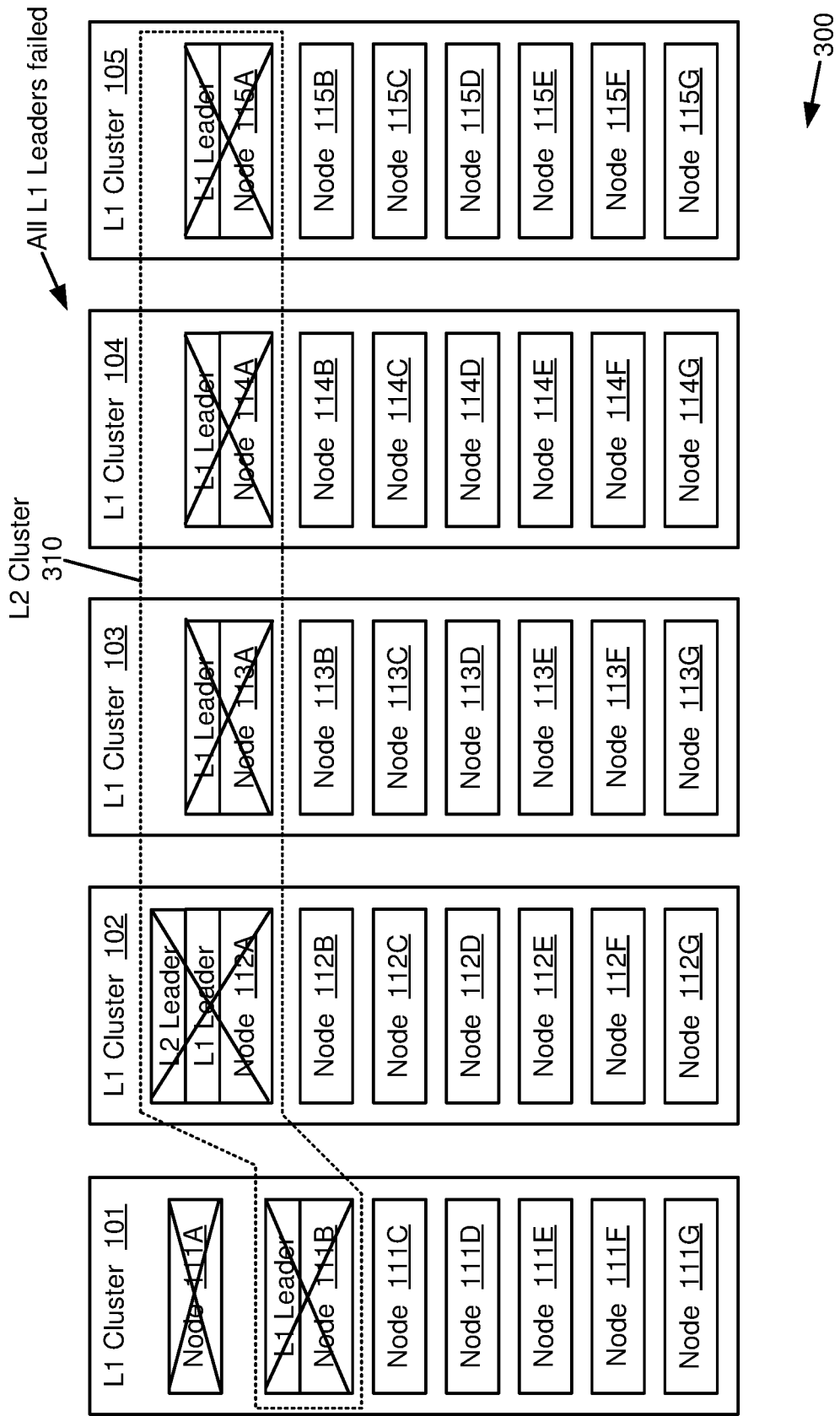
Figure 3F:
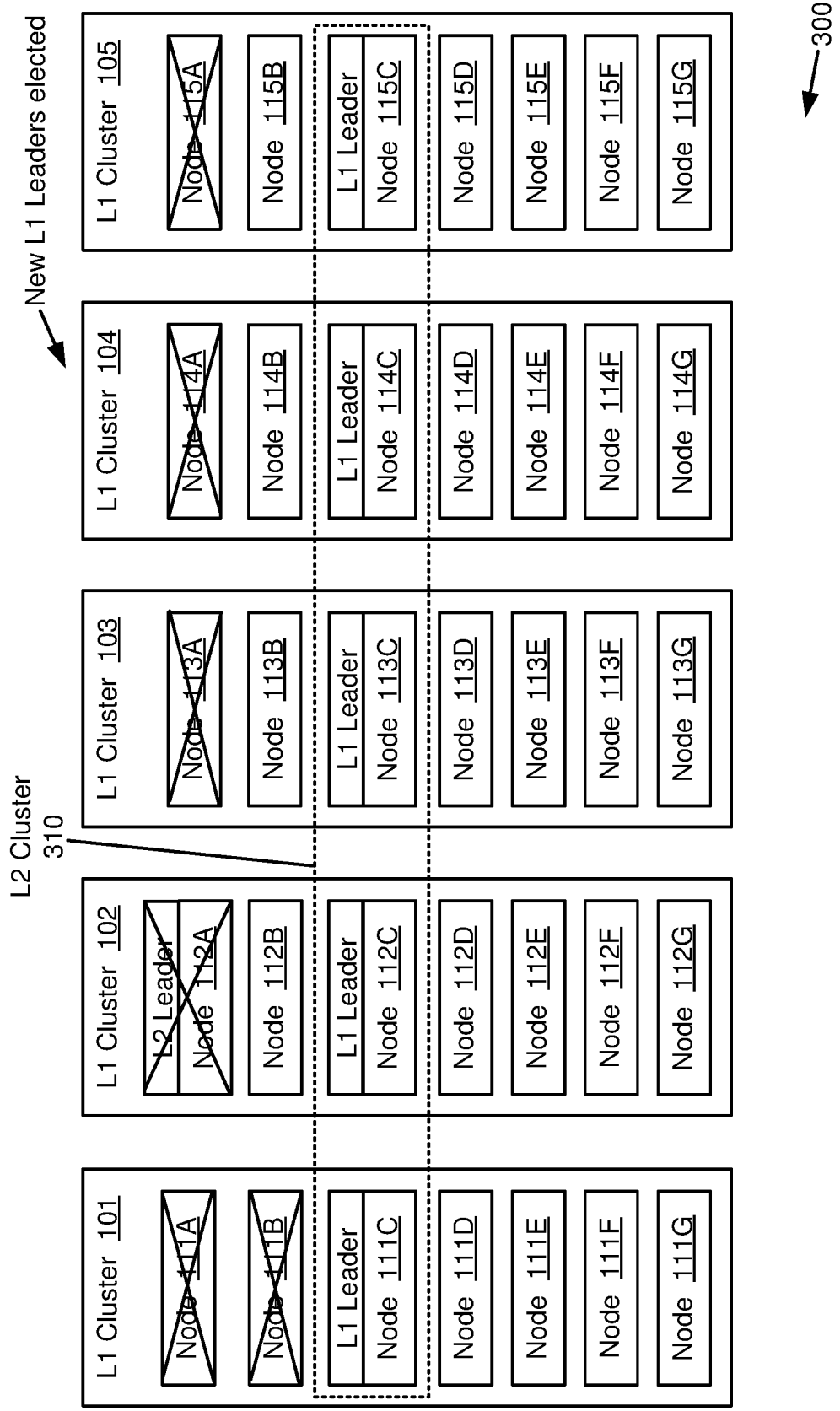
Figure 3G:
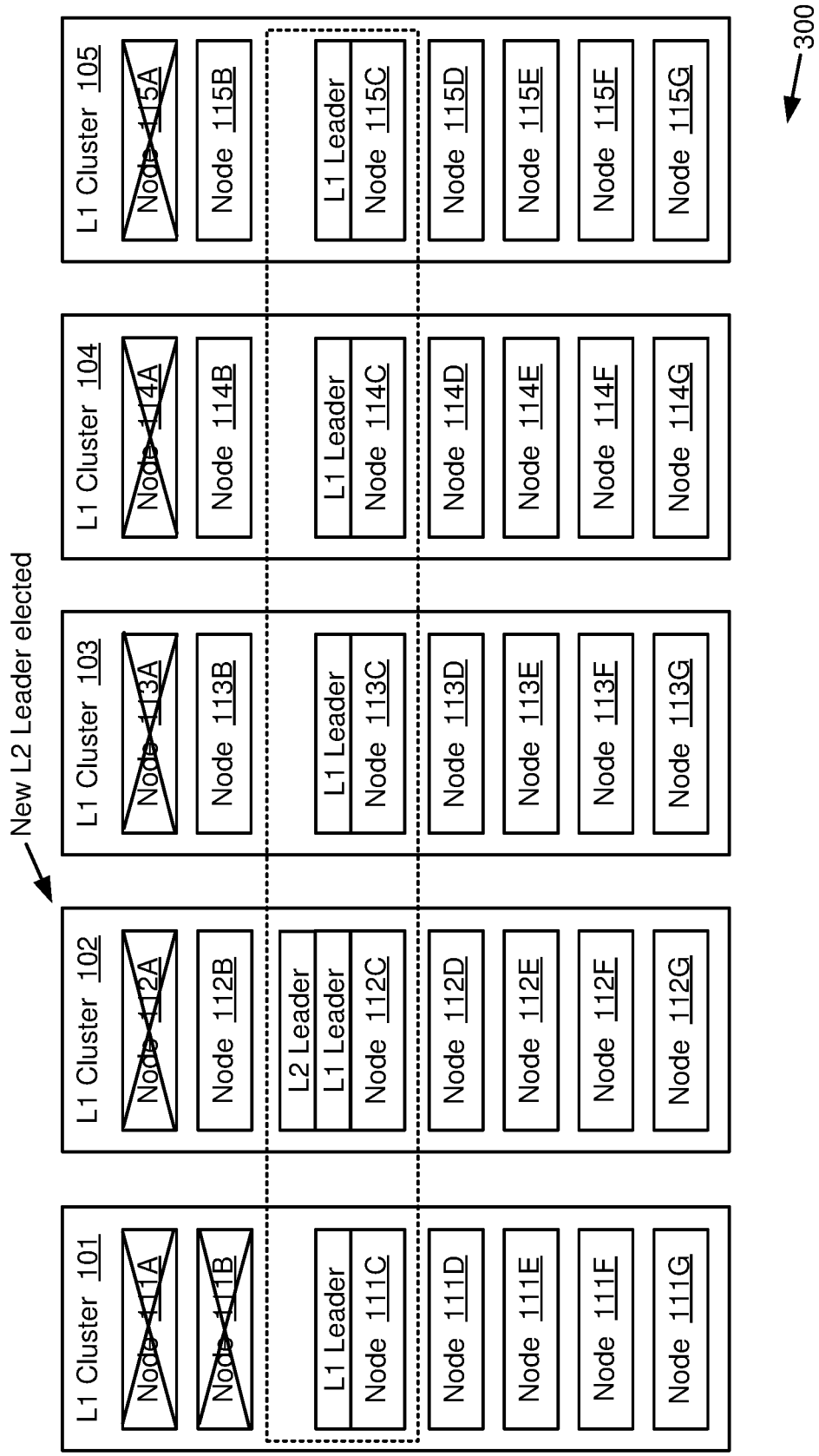

Referring again to FIG. 2, if it is determined at decision block 250 that the L2 cluster no longer has a quorum ("NO"), then the process 200 may continue at block 260, including reestablishing a quorum in the L2 cluster and electing a new L2 leader. After block 260, the process 200 may return to block 230 (described above). For example, FIG. 3E illustrates that all L1 leaders have failed in the disaggregated storage system 300, and therefore the L2 cluster 310 lacks a quorum to conduct an election. In response, as shown in FIG. 3F, each L1 cluster may elect a new L1 leader, and these new L1 leaders (i.e., L1 leaders 111C, 112C, 113C, 114C, 115C) may be included in (or otherwise join) the L2 cluster 310. Further, as shown in FIG. 3G, the member nodes of the L2 cluster 310 may then conduct an election that selects the compute node 112C (i.e., the L1 leader in the L1 cluster 102) as the new L2 leader. In this manner, the disaggregated storage system 300 may recover from the loss of all L1 leaders, and may resume handling client requests. Note that, while FIG. 3F illustrates that all failed L1 leader is replaced before conducting the election for L2 leader, implementations are not limited in this regard. For example, if the required quorum for the L2 cluster 310 is three members, then the L2 leader may be elected after only three L1 leaders have been replaced and are included in the L2 cluster 310.

In some implementations, the disaggregated storage system 300 may recover from the loss of a maximum number or percentage of nodes (e.g., 70% of total number of nodes).

Figure 3H:
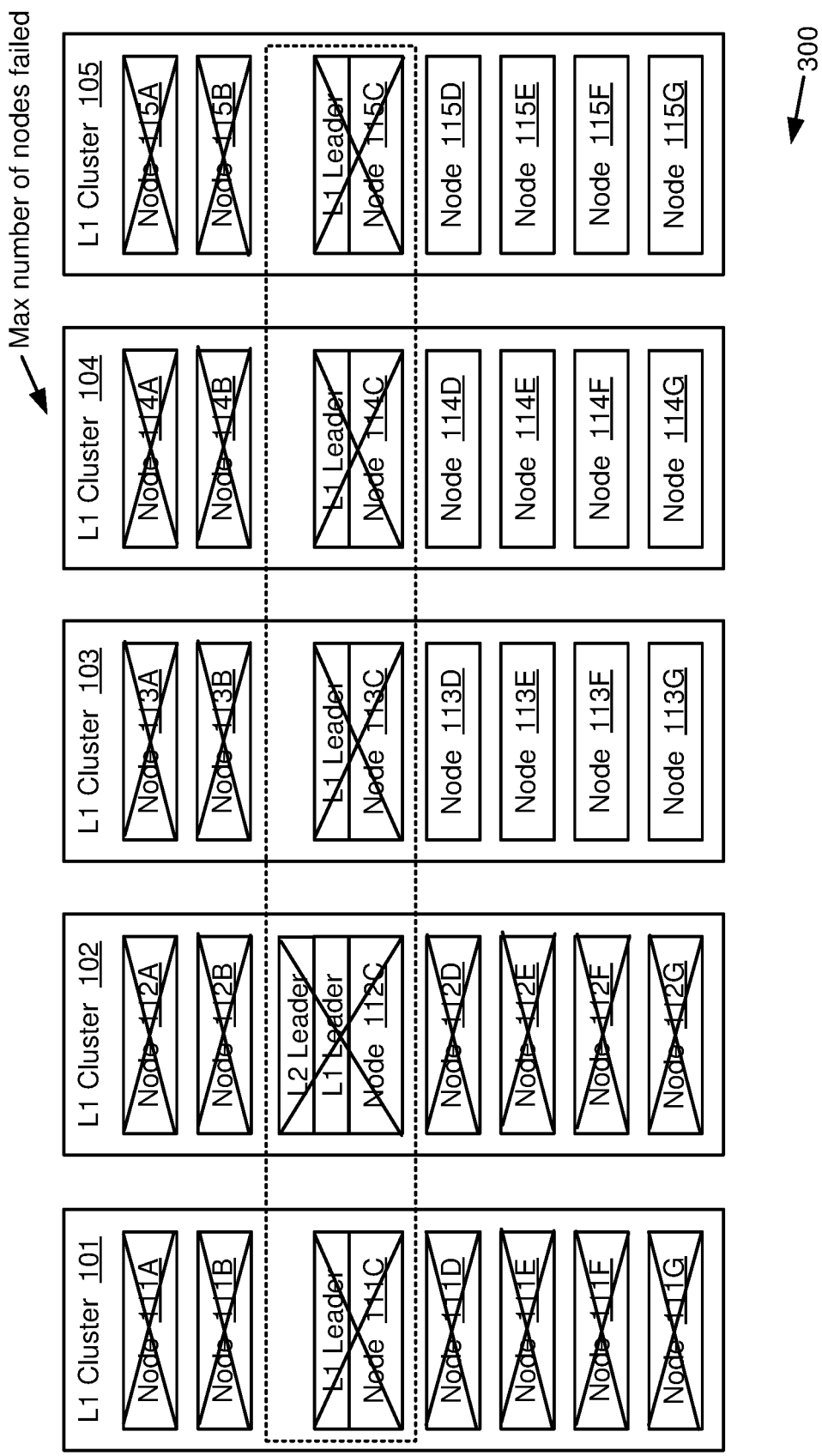
Figure 3I:
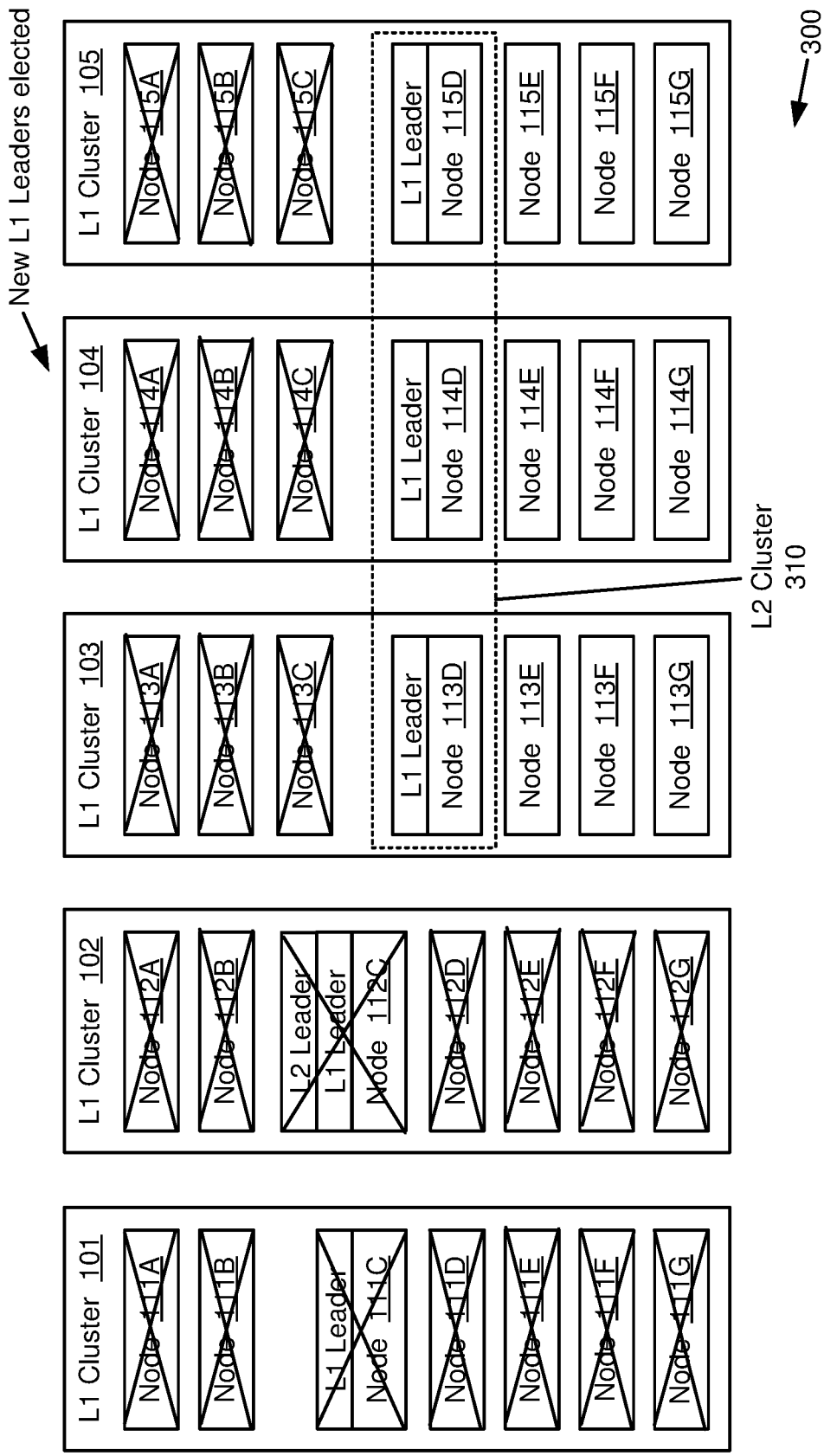
Figure 3J:
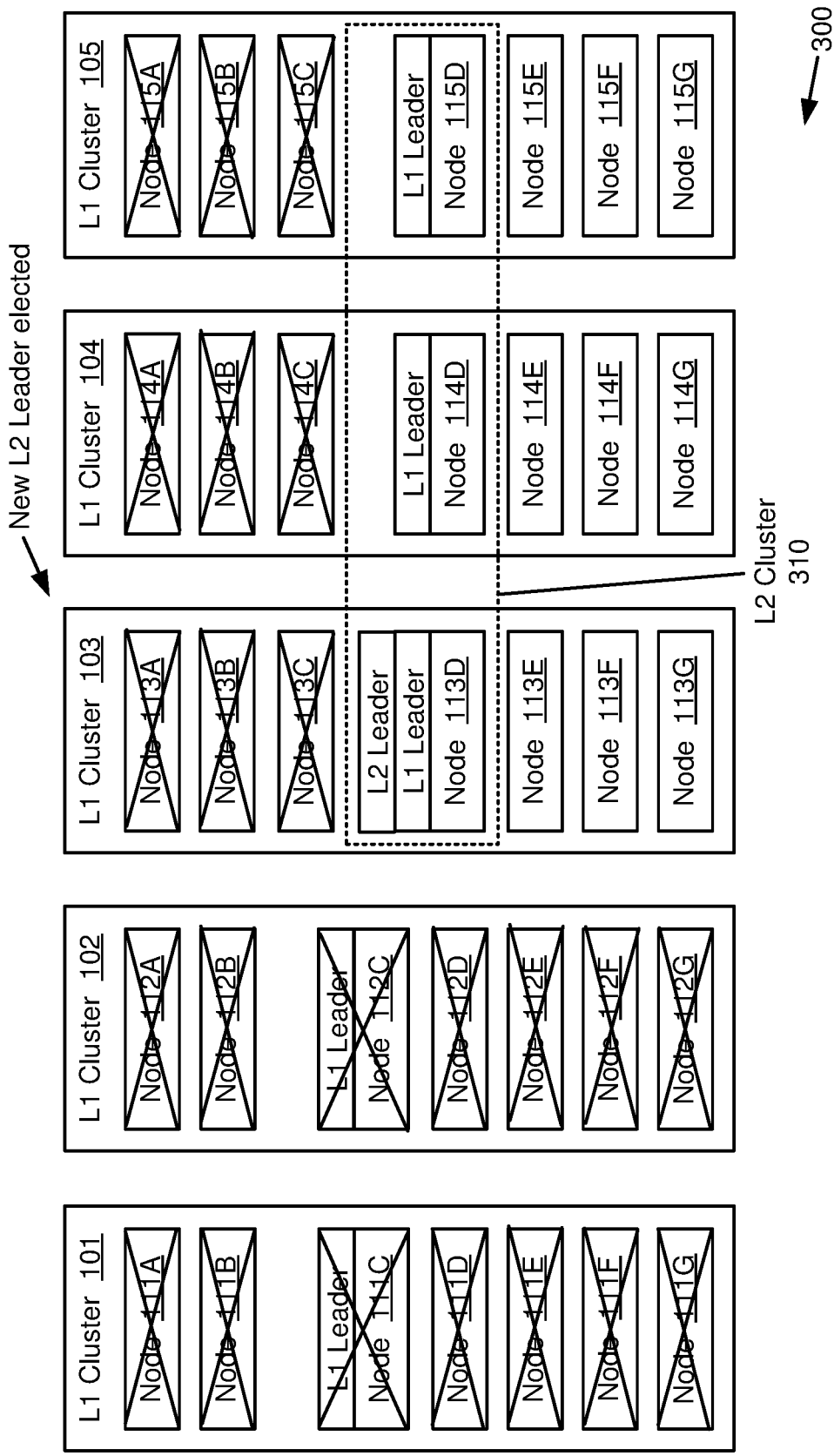

For example, FIG. 3H illustrates that the disaggregated storage system 300 has lost a maximum number of nodes. In response, as shown in FIG. 3I, each L1 cluster that still includes functioning nodes (i.e., L1 clusters 103, 104, 105) elects a new L1 leader, and these new L1 leaders (i.e., L1 leaders 113D, 114D, 115D) may be included in the L2 cluster 310. Further, as shown in FIG. 3J, the member nodes of the L2 cluster 310 may then conduct an election that selects the compute node 113D (i.e., the L1 leader in the L1 cluster 103) as the new L2 leader. In this manner, the disaggregated storage system 300 may recover from the loss of a maximum number of compute nodes, and may resume handling client requests.

Examples described herein may enable efficient performance of consensus techniques even when there are a relatively large number of compute nodes in the cluster being managed, while still being able to survive multiple compute node failures, by using multiple cluster levels. For example, in the example of FIGS. 3A-3J, disaggregated storage system 300 includes 35 nodes. The example configuration illustrated in FIG. 3A, with five L1 clusters, each with seven members, and an L2 cluster comprising a node from each of the L1 clusters, may significantly reduce network overhead (e.g., by 1/7th or 86%) as compared to a flat cluster with 35 members, while reducing the worst case resiliency by approximately 35% and increasing the best case resiliency by approximately 35%.

For example, if all 35 nodes were included in a single, flat (i.e., not multi-level) cluster with all 35 nodes as members of the cluster, then each transaction initiated with the leader of that cluster may be replicated to the other 34 members of the cluster. In contrast, in the example of FIG. 3A, the L2 leader may replicate a transaction on the cluster management data to the four other L2 members, which is far fewer. Specifically, in the example of FIG. 3A, a transaction may include 5 requests (i.e., the original request, and four replication requests), while the flat cluster may include 35 requests for a transaction (i.e., the original request, and 34 replication requests), which may significantly reduce the network overhead ($5/35=1/7$th). In addition, a worst case resiliency would be the minimum number of node failures that could cause a loss of quorum. In the example of FIG. 3A, 12 nodes is the minimum number that could be lost to cause a loss of quorum (i.e., specifically losing four members from each of 3 different L1 clusters [4*3=12]), while in a 35 node flat cluster, losing any 18 out of the 35 would cause a loss of quorum. As such, the flat cluster can survive any 17 failures, while the example of FIG. 3A can survive any 11 node failures (which is an approximately 35% reduction [from 17 down to 11] in worst case resiliency for the example of FIG. 3A. Best case resiliency would be the maximum number of nodes that could be lost before losing quorum. As shown in FIG. 3J, the example of FIG. 3A could lose 7 out of 7 nodes in two L1 clusters (i.e., 14 nodes) and 3 out of 7 nodes in the other three L1 clusters (i.e., 9 more nodes for a total of 23 nodes) and still have quorum (while the 24th node lost would cause a failure). For the flat cluster there is no difference between the minimum and maximum resiliency for the flat cluster, so it could lose 17 out of 35 before a failure. As such, the example of FIG. 3A could increase the best case resiliency by 35% from surviving 17 node failures to surviving 23 node failures.

The example configuration illustrated in FIG. 3A may also compare favorably to another alternative without the multiple cluster levels in which, for example, a fixed set of 5 of the 35 nodes are selected as cluster members while the other 30 nodes are not members of the cluster (i.e., not involved in establishing quorum). Such an example may have a similar amount of steady-state network traffic since the fixed set of 5 members is the same size as the L2 cluster in FIG. 3A. However, with the fixed set of 5 member nodes, when a member node fails there is no automatic recovery and it is up to an administrator to repair the node in order to bring the cluster back to its full membership. In the fixed cluster, the worst case resiliency may occur when all of the failures are among the fixed member nodes, and in such a case the third node failure would cause a loss of quorum, so that alternative would only be guaranteed to survive two node failures. In contrast, the example of FIG. 3A may survive at least 11 failures (as described above), which is an improvement of 550% over the fixed set alternative (i.e., from 2 nodes to 11 nodes) $11/2=550\%$. The best case resiliency of the fixed cluster alternative would be losing all of the non-member nodes and 2 member nodes, so it could survive up to 32 node failures. So, the example of FIG. 3A may be 28% worse in the best case resiliency (i.e., down from 32 to 23 node failures being survivable).

Note that, although FIGS. 3A-3J illustrate the disaggregated storage system 300 as including two cluster levels (i.e., L1 and L2 clusters), implementations are not limited in this regard. In particular, it is contemplated that the disaggregated storage system 300 may include more than two cluster levels. An example storage system including more than two cluster levels is described below with reference to FIG. 5.

Note also that, while the use of multiple cluster levels is described above as being implemented in a disaggregated storage system, implementations are not limited in this regard. In particular, it is contemplated that multiple cluster levels (e.g., the (i.e., L1 and L2 clusters described above with reference to FIGS. 1-3J) may be implemented in other types of storage systems, in other types of computing systems, and so forth.

FIGS. 4A-4D—Example Operations to Establish a Disaggregated Storage System

FIGS. 4A-4D illustrate example operations to establish a disaggregated storage system, in accordance with some implementations. For example, the operations illustrated in FIGS. 4A-4D may be performed to establish the disaggregated storage system 300 (shown in FIGS. 3A-3J) by adding compute nodes in specific growth directions.

Referring now to FIG. 4A, shown is the disaggregated storage system 300 at time of initialization. As shown, the disaggregated storage system 300 may be initialized with a single compute node 111A in the L1 cluster 101. The single compute node 111A may be designated as the L1 leader. Starting from the state shown in FIG. 4A, the disaggregated storage system 300 may be expanded by adding one compute node to each of L1 clusters 102-105 in turn (illustrated by the arrow labelled "growth direction A"). Further, the single compute node in each L1 cluster may be designated as the respective L1 leader.

Referring now to FIG. 4B, after establishing an L1 leader in each L1 cluster, the L1 leaders (i.e., L1 leaders 111A, 112A, 113A, 114A, 115A) may be grouped to form the L2 cluster 310. Further, the L1 leaders may hold an election, and may thereby elect the compute node 111A as the L2 leader of the L2 cluster 310. The disaggregated storage system 300 may then be expanded by adding a set of two compute nodes (or any other number of compute nodes, such as one, three, etc.) to the L1 cluster 101 (illustrated by the arrow labelled "growth direction B").

Figure 4C:
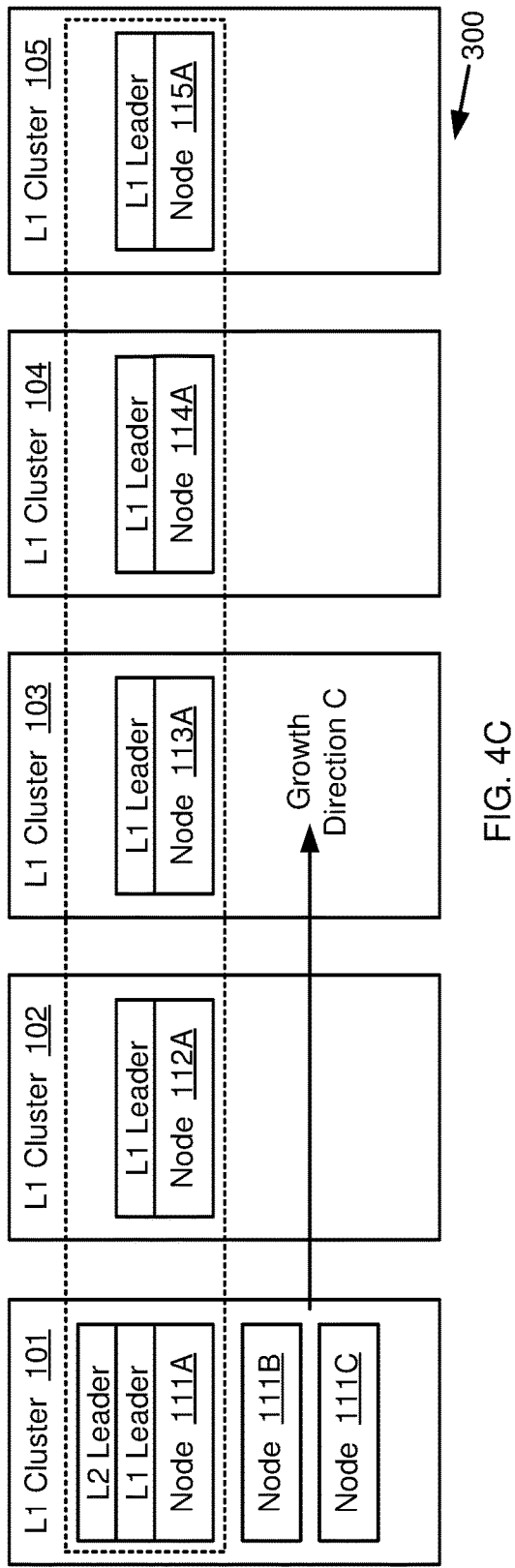
Figure 4D:
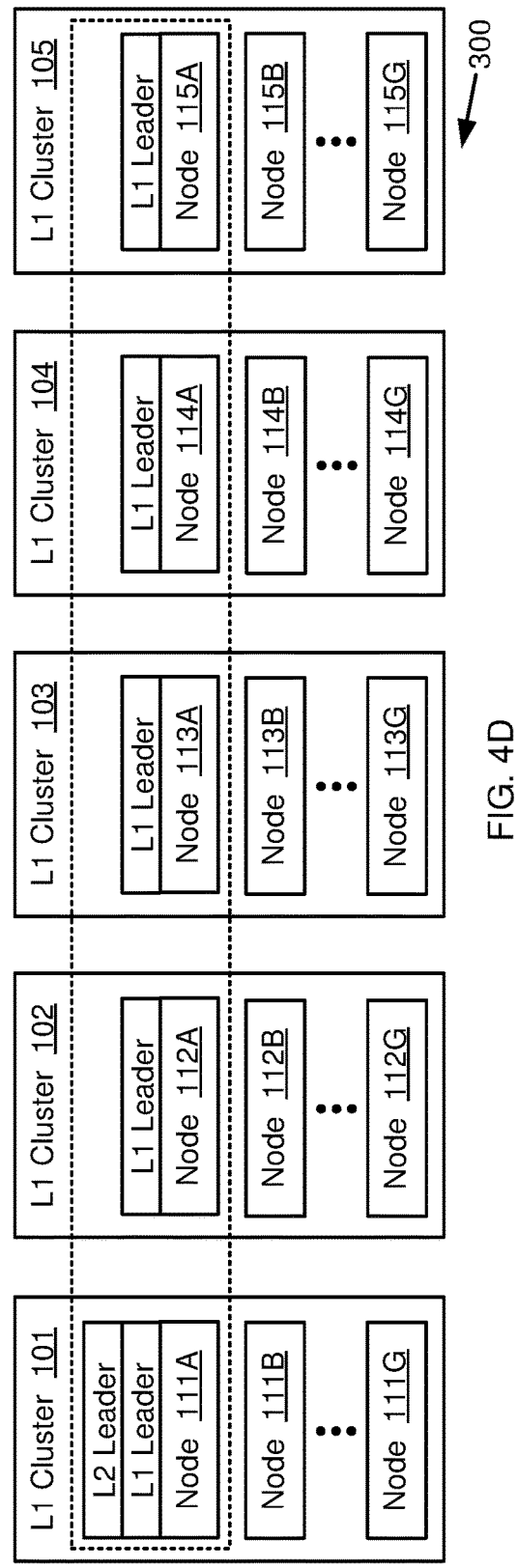

Referring now to FIG. 4C, once the set of two compute nodes (i.e., compute nodes 111B and 111C) are added to the L1 cluster 101, the disaggregated storage system 300 may then be expanded by adding a set of two compute nodes first to the L1 cluster 102, and then to L1 cluster 103, L1 cluster 104, and L1 cluster 105 in turn (e.g., as illustrated by the arrow labelled "growth direction C"). Subsequently, another set of two compute nodes may be added to each of L1 clusters 101-105 in turn, and finally a single compute node may be added to each of L1 clusters 101-105 in turn. Referring now to FIG. 4D, once all L1 clusters 101-105 are full, the disaggregated storage system 300 may be established at its full capacity of compute nodes.

Figure 5:
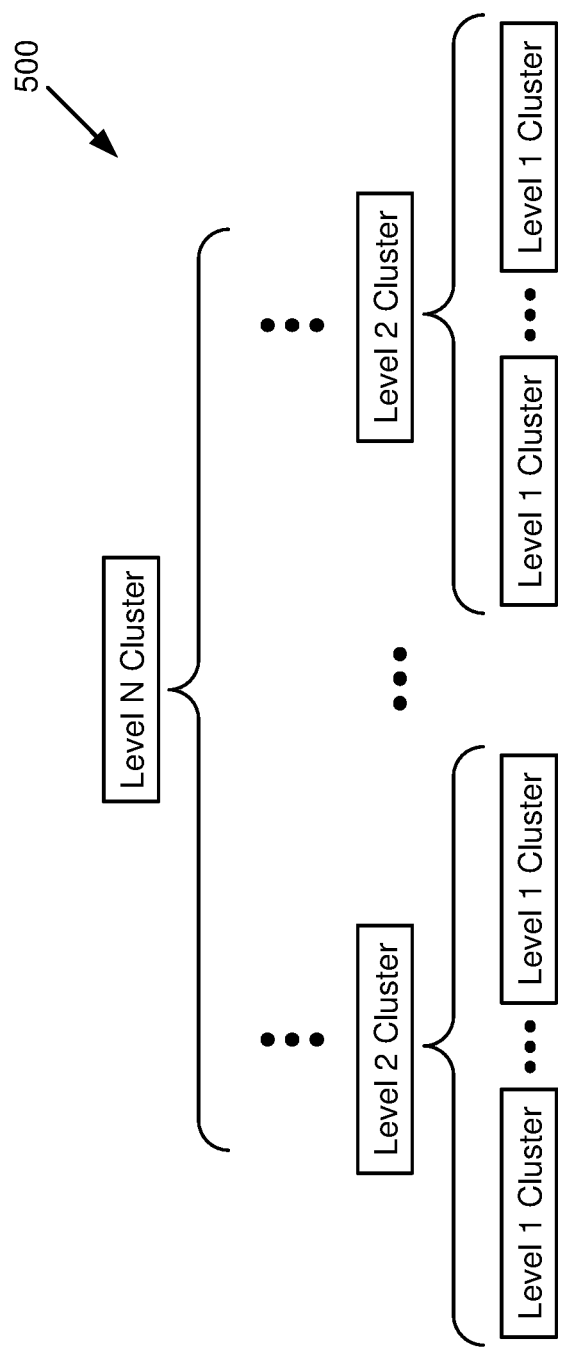
FIG. 5 is an illustration of an example data structure, in accordance with some implementations.

FIG. 5—Example Data Structure

FIG. 5 illustrates an example data structure 500, in accordance with some implementations. The data structure 500 may represent a hierarchy of multiple levels of clusters included in a disaggregated storage system (e.g., disaggregated storage system 300 shown in FIG. 3A). In some implementations, the data structure 500 may include N levels of cluster levels, where N is an integer greater than one. For example, as shown in FIG. 5, the lowest level of the data structure 500 may include multiple level 1 (L1) clusters. Further, the next higher level may include multiple level 2 (L2) clusters, where each L2 cluster includes a group of multiple L1 clusters. This grouping may continue for each higher level of the hierarchy 500, and the highest level N may include a single level N cluster (e.g., where N is an integer greater than two).

In some implementations, for each pair of adjacent levels, the cluster leaders in the lower level may form a cluster in the higher level. For example, referring to FIG. 3A, the L2 cluster 310 may be formed from the L1 leaders of the L1 clusters 101, 102, 103, 104, and 105. Further, for any level of the data structure 500, the failure of one or more compute nodes may be handled in the manner described above with reference to FIGS. 2 and 3A-3J.

Figure 6A:
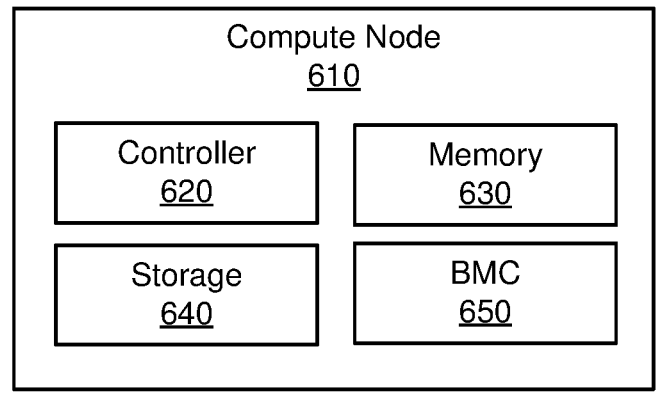
FIGS. 6A-6B are illustrations of example compute nodes, in accordance with some implementations.
Figure 6B:
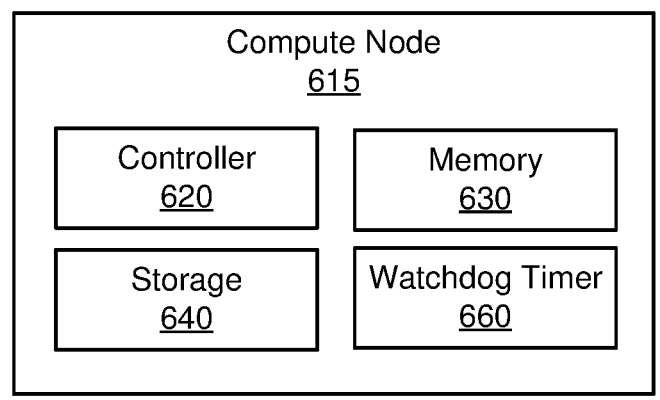

FIGS. 6A-6B—Example Compute Nodes

FIG. 6A illustrates an example compute node 610, in accordance with some implementations. The compute node 610 may correspond generally to an example implementation of the compute nodes 110 (discussed above with reference to FIG. 1). As shown, the compute node 610 may include a controller 620, memory 630, storage 640, and a baseboard management controller (BMC) 650. The storage 640 may include one or more non-transitory storage media such as hard disk drives (HDDs), solid state drives (SSDs), optical disks, and so forth, or a combination thereof. The memory 630 may be implemented by one or more storage devices, including volatile storage device(s) (e.g., random access memory (RAM)), non-volatile storage device(s) (including persistent storage), or a combination thereof.

In some implementations, the BMC 650 may be a specialized controller embedded on an expansion card or on a motherboard of the host device 110. For example, the BMC 650 may support the Intelligent Platform Management Interface (IPMI) architecture, which defines a set of common interfaces to computer hardware and firmware that system administrators can use to monitor health and manage a computing device. Further, the BMC 650 may provide remote management access to the compute node 610, and may provide such remote management access over an out-of-band communication channel, which isolates management communication from communication of an operating system of the compute node 610. In some implementations, the BMC 610 may enable lights-out management of the compute node 610, which provides remote management access (e.g., system console access) to the compute node 610 regardless of whether the compute node 610 is powered on, whether a primary network subsystem hardware is functioning, or whether the operating system of the compute node 610 is operating.

In some implementations, the BMC 650 may be used to recover if the compute node 600 becomes unresponsive while acting as an L1 leader of an L1 cluster. For example, assume that the compute node 610 represents the L1 leader 111A of L1 cluster 101 (shown in FIG. 3A), and therefore may be assigned the representative network address for L1 cluster 101. Further, assume that compute node 610 becomes unresponsive or "frozen" (e.g., due to an operating system crash) while acting as L1 leader. Accordingly, the remaining compute nodes of the L1 cluster 101 may hold an election to select a new L1 leader. However, assume that the unresponsive compute node 610 retains ownership of the representative network address, and therefore the elected compute node cannot act as a new L1 leader. In some implementations, the elected compute node (or another compute node or entity) may command the BMC 650 to power down or restart the unresponsive compute node 610, thereby causing the representative network address to be released from the unresponsive compute node 610. In this manner, the BMC 650 of the unresponsive compute node 610 may be used to allow the elected compute node to take over as the L1 leader.

Referring now to FIG. 6B, shown is a compute node 615, in accordance with some implementations. As shown in FIG. 6B, the compute node 615 may include the same components as the compute node 610 (shown in FIG. 6A), except that the BMC 650 is replaced by the watchdog timer 660. In some implementations, the watchdog timer 660 may be a circuit or software that generates or receives a periodic signal during normal operation of the compute node 615 (e.g., every ten seconds). Further, the watchdog timer 660 may measure the time between the periodic signals, and may determine whether the measured time exceeds a timeout threshold. In some implementations, the measured time may exceed the timeout threshold if the compute node 610 has become unresponsive. Accordingly, upon detecting that the timeout threshold has been exceeded, the watchdog timer 660 may cause the unresponsive compute node 610 to restart or reboot, thereby causing the representative network address to be released from the unresponsive compute node 610. In this manner, the watchdog timer 660 of the unresponsive compute node 610 may be used to allow an elected compute node to take over as the L1 leader.

Figure 7:
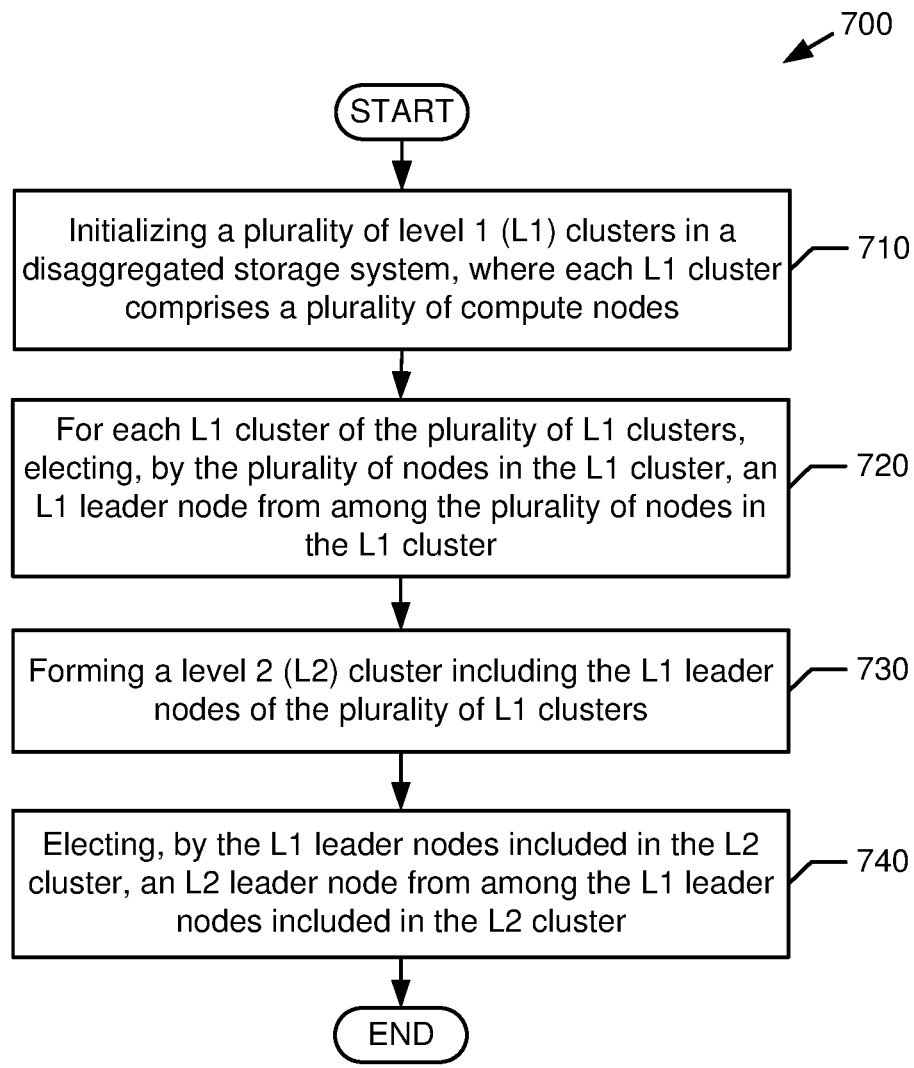
FIG. 7 is an illustration of an example process, in accordance with some implementations.

FIG. 7—Example Process for Disaggregated Storage

Referring now to FIG. 7, shown is an example process 700 for disaggregated storage, in accordance with some implementations. The process 700 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 700 are described below with reference to FIGS. 1-5, which show examples in accordance with some implementations. However, other implementations are also possible.

Block 710 may include initializing a plurality of level 1 (L1) clusters in a disaggregated storage system, where each L1 cluster comprises a plurality of compute nodes. Block 720 may include, for each L1 cluster of the plurality of L1 clusters, electing, by the plurality of nodes in the L1 cluster, an L1 leader node from among the plurality of nodes in the L1 cluster. Block 730 may include forming a level 2 (L2) cluster including the L1 leader nodes of the plurality of L1 clusters. Block 740 may include electing, by the L1 leader nodes included in the L2 cluster, an L2 leader node from among the L1 leader nodes included in the L2 cluster.

Figure 8:
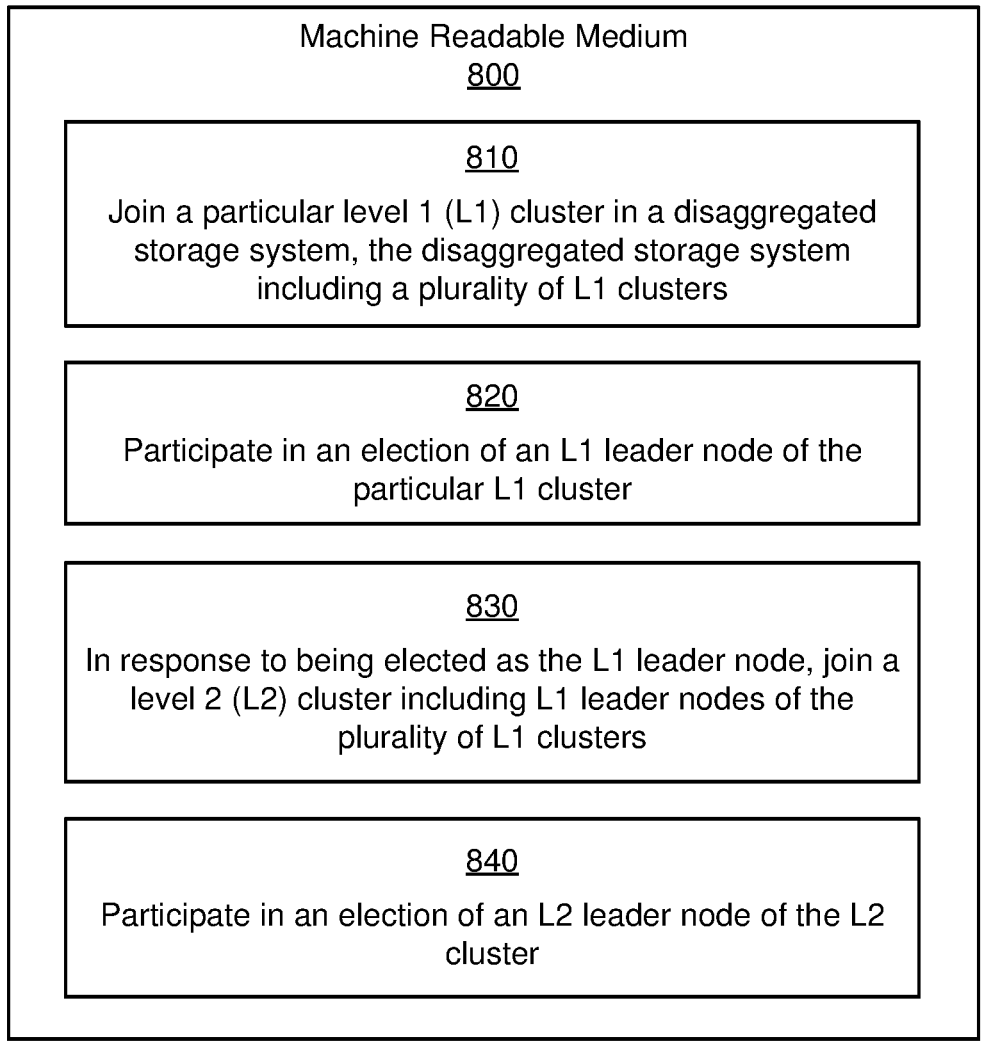
FIG. 8 is a diagram of an example machine-readable medium storing instructions in accordance with some implementations.

FIG. 8—Example Machine-Readable Medium

FIG. 8 shows a machine-readable medium 800 storing instructions 810-840, in accordance with some implementations. The instructions 810-840 can be executed by a single processor, multiple processors, a single processing engine, multiple processing engines, and so forth. For example, in some implementations, the instructions 810-840 may be executed by the controller 620 of compute node 610 (shown in FIG. 6A), or by the controller 620 of compute node 615 (shown in FIG. 6B). The machine-readable medium 800 may be a non-transitory storage medium, such as an optical, semiconductor, or magnetic storage medium.

Instruction 810 may be executed to join a particular level 1 (L1) cluster in a disaggregated storage system, the disaggregated storage system including a plurality of L1 clusters. For example, referring to FIG. 3A, the compute node 111A may join the L1 cluster 101 of the disaggregated storage system 300. The disaggregated storage system 300 also includes other L1 cluster 102-105.

Instruction 820 may be executed to participate in an election of an L1 leader node of the particular L1 cluster. For example, referring to FIG. 3A, the compute nodes 111A-111G in the L1 cluster 101 conduct an election, and the compute node 111A is elected as the L1 leader of the L1 cluster 101.

Instruction 830 may be executed to, in response to being elected as the L1 leader node, join a level 2 (L2) cluster including L1 leader nodes of the plurality of L1 clusters. For example, referring to FIG. 3A, the L1 leader node 111A is grouped with the L1 leader nodes of the other L1 clusters 102-105 to form the L2 cluster 310.

Instruction 840 may be executed to participate in an election of an L2 leader node of the L2 cluster. For example, referring to FIG. 3A, the L1 leader nodes in the L2 cluster 310 conduct an election, and the L1 leader node 111A is elected as the L2 leader of the L2 cluster 310.

Figure 9:
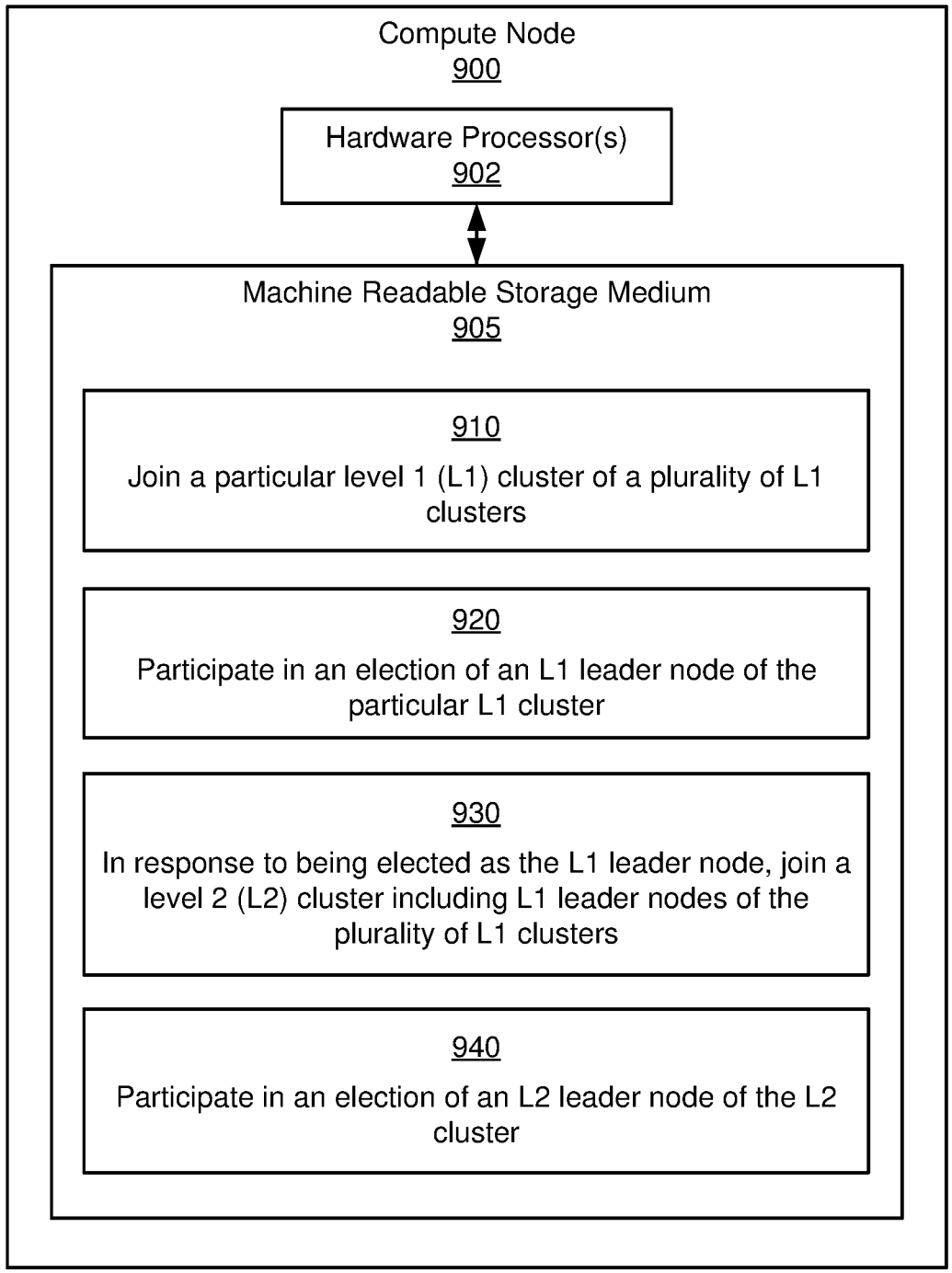
FIG. 9 is a schematic diagram of an example compute node, in accordance with some implementations.

FIG. 9—Example Compute Node

FIG. 9 shows a schematic diagram of an example compute node 900. In some examples, the computer node 900 may be a computing device that corresponds generally to one or more of the compute node 110 (shown in FIG. 1), the compute node 610 (shown in FIG. 6A, and/or the compute node 615 (shown in FIG. 6B). As shown, the compute node 900 may include hardware processor 902 and machine-readable storage 905 including instruction 910-940. The machine-readable storage 905 may be a non-transitory medium. The instructions 910-940 may be executed by the hardware processor 902, or by a processing engine included in hardware processor 902.

Instruction 910 may be executed to join a particular level 1 (L1) cluster in a disaggregated storage system, the disaggregated storage system including a plurality of L1 clusters. For example, referring to FIG. 3A, the compute node 111A may join the L1 cluster 101 of the disaggregated storage system 300. The disaggregated storage system 300 also includes other L1 cluster 102-105.

Instruction 920 may be executed to participate in an election of an L1 leader node of the particular L1 cluster. For example, referring to FIG. 3A, the compute nodes 111A-111G in the L1 cluster 101 conduct an election, and the compute node 111A is elected as the L1 leader of the L1 cluster 101.

Instruction 930 may be executed to, in response to being elected as the L1 leader node, join a level 2 (L2) cluster including L1 leader nodes of the plurality of L1 clusters. For example, referring to FIG. 3A, the L1 leader node 111A is grouped with the L1 leader nodes of the other L1 clusters 102-105 to form the L2 cluster 310.

Instruction 940 may be executed to participate in an election of an L2 leader node of the L2 cluster. For example, referring to FIG. 3A, the L1 leader nodes in the L2 cluster 310 conduct an election, and the L1 leader node 111A is elected as the L2 leader of the L2 cluster 310.

In accordance with implementations described herein, a disaggregated storage system may include storage devices and a relatively large number of compute nodes (e.g., more than seven) arranged in two or more cluster levels. The compute nodes may be divided into multiple level 1 (L1) clusters, with each L1 cluster including multiple compute nodes. In each L1 cluster, a leader may be elected by the compute nodes in that L1 cluster. Further, the L1 leader nodes may be grouped into a level 2 (L2) cluster, and may then elect a leader of the L2 cluster (referred to herein as the "L2 leader" or "L2 leader node"). The L1 leaders in the L2 cluster may be responsible for maintaining and updating multiple copies of cluster management data. Further, updating the multiple copies of the cluster management data may involve achieving consensus among the L1 leaders in the L2 cluster. In contrast, the follower nodes in the L1 clusters) are not involved in achieving this consensus. As such, consensus can be achieved without involving a relatively large number of messages among all of the compute nodes in the L1 clusters. Further, the follower nodes in the L1 clusters may be responsible for electing the L1 leaders, including replacing any L1 leaders that fail during operation. Accordingly, the follower nodes in the L1 cluster may be used to recover from the failure of L1 leaders in the L2 cluster. In this manner, the hierarchical structure of the L1 and L2 clusters may improve the failure tolerance of the disaggregated storage system by including a relatively large number of compute nodes, but without suffering the loss of performance associated with using a relatively large number of compute nodes in a single cluster.

Note that, while FIGS. 1-9 show various examples, implementations are not limited in this regard. For example, referring to FIG. 1, it is contemplated that the L1 cluster 100 and the compute nodes 110 may include additional devices and/or components, fewer components, different components, different arrangements, and so forth. Further, it is contemplated that the compute nodes 110 may be implemented as virtual devices, and/or the storage devices 120 may be implemented as virtual storage nodes. In another example, it is contemplated that the functionality of the cluster management software 130 described above may be included in any other software of the L1 cluster 100, in any controller or circuit of the L1 cluster 100, and so forth. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   initializing a plurality of level 1 (L1) clusters in a disaggregated storage system, wherein each L1 cluster comprises a plurality of compute nodes;
   for each L1 cluster of the plurality of L1 clusters, electing, by the plurality of nodes in the L1 cluster, an L1 leader node from among the plurality of nodes in the L1 cluster;
   forming a level 2 (L2) cluster including the L1 leader nodes of the plurality of L1 clusters; and
   electing, by the L1 leader nodes included in the L2 cluster, an L2 leader node from among the L1 leader nodes included in the L2 cluster.

2. The method of claim 1, comprising:
   writing, by the L1 leader nodes in the L2 cluster, data to at least one storage device of the disaggregated storage system.

3. The method of claim 2, comprising:
   mounting, by the L1 leader nodes in the L2 cluster, a filesystem for writing the data to the at least one storage device, wherein follower nodes in the L1 clusters lack the filesystem for writing the data.

4. The method of claim 2, comprising:
   receiving, by the L2 leader node, a request to write data to the at least one storage device;
   recording, by the L2 leader node, the request in a log entry;
   communicating, by the L2 leader node, the log entry to other L1 leader nodes in the L2 cluster;
   determining, by the L2 leader node, whether at least a minimum number of the other L1 leader nodes of the L2 cluster have acknowledged the log entry; and
   in response to a determination that at least the minimum number of the other L1 leader nodes of the L2 cluster have acknowledged the log entry, executing the request to write the data to the at least one storage device.

5. The method of claim 1, wherein the disaggregated storage system comprises a hierarchy of N cluster levels, and wherein N is an integer greater than two.

6. The method of claim 1, comprising:
   determining that the L2 leader node has failed, wherein the L2 leader node is included in a first L1 cluster, and wherein the L2 cluster includes one or more L1 leader nodes that remain in operation; and
   in response to determining that the L2 leader node has failed:
     electing a new L2 leader node by the one or more L1 leader nodes that remain in operation;
     after electing the new L2 leader node, electing a new L1 leader node for the first L1 cluster, wherein the new L1 leader node is included in the L2 cluster.

7. The method of claim 1, comprising:
   determining whether the L2 cluster has a quorum of L1 leader nodes; and
   in response to determining that the L2 cluster does not have the quorum of L1 leader nodes:
     reestablishing the quorum of L1 leaders in the L2 cluster;
     electing a new L2 leader node by the quorum of L1 leaders in the L2 cluster.

8. The method of claim 1, comprising:
   determining that a particular L1 leader node for a particular L1 cluster has failed, wherein the L2 leader node remains in operation; and
   in response to determining that the a particular L1 leader node has failed:
     electing, by available compute nodes of the particular L1 cluster, a new L1 leader node for the particular L1 cluster, wherein the new L1 leader node is included in the L2 cluster.

9. A non-transitory machine-readable medium storing instructions that upon execution cause a processor to:
   join a particular level 1 (L1) cluster in a disaggregated storage system, the disaggregated storage system including a plurality of L1 clusters;
   participate in an election of an L1 leader node of the particular L1 cluster;
   in response to being elected as the L1 leader node, join a level 2 (L2) cluster including L1 leader nodes of the plurality of L1 clusters; and
   participate in an election of an L2 leader node of the L2 cluster.

10. The non-transitory machine-readable medium of claim 9, including instructions that upon execution cause the processor to:
    after joining the L2 cluster, write data to at least one storage device of the disaggregated storage system.

11. The non-transitory machine-readable medium of claim 10, including instructions that upon execution cause the processor to:
    after joining the L2 cluster, mount a filesystem to write the data to the at least one storage device, wherein follower nodes in the L1 clusters lack the filesystem.

12. The non-transitory machine-readable medium of claim 10, including instructions that upon execution cause the processor to:
    after being elected as the L2 leader node, receive a request to write data to the at least one storage device;
    record the request in a log entry;
    communicate the log entry to other L1 leader nodes in the L2 cluster;
    in response to a determination that at least a minimum number of the other L1 leader nodes of the L2 cluster have acknowledged the log entry, cause execution of the request to write the data to the at least one storage device.

13. The non-transitory machine-readable medium of claim 9, including instructions that upon execution cause the processor to:
in response to a determination that the L2 leader node has failed, participate in an election for a new L2 leader node.

14. The non-transitory machine-readable medium of claim 9, wherein the disaggregated storage system comprises a hierarchy of N cluster levels, and wherein N is an integer greater than two.

15. A compute node comprising:
a controller; and
a machine-readable storage storing instructions, the instructions executable by the controller to:
join a particular level 1 (L1) cluster of a plurality of L1 clusters;
participate in an election of an L1 leader node of the particular L1 cluster;
in response to being elected as the L1 leader node, join a level 2 (L2) cluster including L1 leader nodes of the plurality of L1 clusters; and
participate in an election of an L2 leader node of the L2 cluster.

16. The compute node of claim 15, including instructions executable by the controller to:
after joining the L2 cluster, write data to at least one storage device associated with the L2 cluster.

17. The compute node of claim 16, including instructions executable by the controller to:
after joining the L2 cluster, mount a filesystem to write the data to the at least one storage device, wherein follower nodes in the L1 clusters lack the filesystem.

18. The compute node of claim 16, including instructions executable by the controller to:
after being elected as the L2 leader node, receive a request to write data to the at least one storage device;
record the request in a log entry;
communicate the log entry to other L1 leader nodes in the L2 cluster;
in response to a determination that at least a minimum number of the other L1 leader nodes of the L2 cluster have acknowledged the log entry, cause execution of the request to write the data to the at least one storage device.

19. The compute node of claim 15, including instructions executable by the controller to:
in response to a determination that the L2 leader node has failed, participate in an election for a new L2 leader node.

20. The compute node of claim 15, wherein the disaggregated storage system comprises a hierarchy of N cluster levels, and wherein N is an integer greater than two.

* * * * *